US008164562B2

(12) United States Patent
Lee et al.

(10) Patent No.: US 8,164,562 B2
(45) Date of Patent: Apr. 24, 2012

(54) DISPLAY DEVICE AND DRIVING METHOD THEREOF

(75) Inventors: Myung-Woo Lee, Seoul (KR); Sang-Jin Pak, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1070 days.

(21) Appl. No.: 11/867,981

(22) Filed: Oct. 5, 2007

(65) Prior Publication Data

US 2008/0094531 A1 Apr. 24, 2008

(30) Foreign Application Priority Data

Oct. 24, 2006 (KR) ........................ 10-2006-0103375
Apr. 27, 2007 (KR) ........................ 10-2007-0041300

(51) Int. Cl.
*G06F 3/36* (2006.01)

(52) U.S. Cl. ............ 345/100; 345/92; 345/204; 345/96; 345/210

(58) Field of Classification Search ............ 345/87–104, 345/204, 211
See application file for complete search history.

(56) References Cited

U.S. PATENT DOCUMENTS 5,706,023 A * 1/1998 Nagata et al. .................. 345/92
7,038,643 B2 5/2006 Park
7,081,890 B2 7/2006 Park et al.
2002/0084969 A1* 7/2002 Ozawa ............................ 345/96
2003/0179174 A1 9/2003 Matsuda et al.
2005/0057465 A1 3/2005 Yu
2005/0206640 A1 9/2005 Miyamoto et al.
2006/0221034 A1* 10/2006 Nakao et al. .................... 345/92

FOREIGN PATENT DOCUMENTS

CN 1360297 7/2002
CN 1667478 9/2005
EP 0622655 11/1994
EP 1241655 9/2002
EP 1575023 9/2005
JP 2000322020 11/2000
JP 2004046085 2/2004
JP 2004171732 6/2004

(Continued)

OTHER PUBLICATIONS

European Search Report for application No. 07019887.4-1228 dated Mar. 7, 2008.

*Primary Examiner* — Lun-Yi Lao
*Assistant Examiner* — Kelly B Hegarty
(74) *Attorney, Agent, or Firm* — Cantor Colburn LLP

(57) ABSTRACT

A liquid crystal display includes: a plurality of gate lines which transmits gate signals having a gate-on voltage and a gate-off voltage; a plurality of data lines which transmits data voltages; a plurality of storage electrode lines which transmits storage signals; a plurality of pixels, wherein each pixel of the plurality of pixels includes a liquid crystal capacitor connected to a switching element and a common voltage, and a storage capacitor connected to the switching element and a storage electrode line of the plurality of storage electrode lines; a gate driver which generates the gate signals; and a plurality of signal generating circuits which generates the storage signals based on at least one control signal and at least one gate signal. The storage signal applied to each pixel has a voltage level which changes after a charging of the data voltage into the liquid crystal capacitor and the storage capacitor.

40 Claims, 21 Drawing Sheets

FOREIGN PATENT DOCUMENTS

| | | |
|---|---|---|
| JP | 2004199025 | 7/2004 |
| JP | 2004212939 | 7/2004 |
| JP | 2004362745 | 12/2004 |
| JP | 2005025151 | 1/2005 |
| JP | 2005093028 | 4/2005 |
| JP | 2005266043 | 9/2005 |
| JP | 2006253870 | 9/2006 |
| KR | 100212289 | 5/1999 |
| KR | 1020000010461 | 2/2000 |
| KR | 1020000077251 | 12/2000 |
| KR | 1020030073474 | 9/2003 |
| KR | 1020030089483 | 11/2003 |
| KR | 1020040003285 | 1/2004 |
| KR | 1020040053584 | 6/2004 |
| KR | 1020040061680 | 7/2004 |
| KR | 1020040111017 | 12/2004 |
| KR | 1020050028839 | 3/2005 |
| KR | 1020050076166 | 7/2005 |
| KR | 1020060071016 | 6/2006 |
| KR | 1020060078512 | 7/2006 |

* cited by examiner

DISPLAY DEVICE AND DRIVING METHOD THEREOF

This application claims priority to Korean Patent Application No. 10-2006-0103375, filed on Oct. 24, 2006, and Korean Patent Application No. 10-2007-0041300, filed on Apr. 27, 2007, and all the benefits accruing therefrom under 35 U.S.C. §119, the contents of which in their entireties are herein incorporated by reference.

BACKGROUND OF THE INVENTION (a) Field of the Invention

The present invention relates to a display device and a driving method thereof and, more particularly, to a display device and driving method thereof having increased luminance and decreased power consumption.

(b) Description of the Related Art

In general, a liquid crystal display ("LCD") includes a first display panel having pixel electrodes and second display panel having a common electrode, and a liquid crystal layer having an anisotropic dielectric material disposed therebetween. The pixel electrodes are arranged in a substantially matrix pattern, and are connected to switching elements such as thin film transistors ("TFTs"), for example, to sequentially receive data voltages. The common electrode is formed on the entire surface of the second display panel and may receive a common voltage. A liquid crystal capacitor is formed from each pixel electrode, the common electrode and the liquid crystal layer therebetween. The liquid crystal capacitor and the switching element connected to the liquid crystal capacitor form a pixel unit.

In the LCD, a voltage is applied to the pixel electrodes and the common electrode to form an electric field therebetween, e.g., in the liquid crystal layer. The strength of the electric field determines the transmittance of light passing through the liquid crystal layer, and is controlled by the voltage applied to the pixel electrodes and the common electrode to display a desired image. When an electric field is applied to the liquid crystal layer in only one direction, e.g. polarity, degradation of the LCD may occur. In order to prevent the degradation, a polarity of the data voltage with respect to a polarity of the common voltage may be inverted for each frame, row or pixel, for example.

However, a range of the data voltage used for displaying an image using row inversion, e.g., an inversion method in which the polarity of the data voltage is inverted by rows of pixels, is smaller than a range of the data voltage used for displaying an image using dot inversion, e.g., an inversion method in which the polarity of the data voltage is inverted by individual pixels. Thus, if a threshold voltage for driving liquid crystals in the liquid crystal layer is high, such as in a vertical alignment ("VA") mode LCD, a lower voltage of a data voltage range for gray voltage representation used for image display becomes as low as the threshold voltage. Thus, accurate luminance representation becomes difficult.

In addition, small LCDs, such as those used in mobile phones, for example, perform row inversion, which inverts the polarity of the data voltage by rows of pixels to reduce power consumption, but because the small LCDs can require high resolution, power consumption is thereby increased.

BRIEF SUMMARY OF THE INVENTION

A display device according to an exemplary embodiment includes: a plurality of gate lines which transmits gate signals having a gate-on voltage and a gate-off voltage; a plurality of data lines which transmits data voltages; a plurality of storage electrode lines which transmits storage signals; a plurality of pixels arranged in a substantially matrix pattern, wherein each pixel of the plurality of pixels includes a switching element connected to a gate line of the plurality of gate lines and a data line of the plurality of data lines, a liquid crystal capacitor connected to the switching element and a common voltage, and a storage capacitor connected to the switching element and a storage electrode line of the plurality of storage electrode lines; a gate driver which generates the gate signals in a first scanning direction or a second scanning direction; and a plurality of signal generating circuits which generates the storage signals based on at least one control signal and at least one gate signal.

The storage signal applied to at least one pixel of the plurality of pixels has a voltage level which changes after a charging of a charged data voltage into the liquid crystal capacitor and the storage capacitor, and an output order of the storage signals from the plurality of signal generating circuits is changed according to a scanning direction of the gate driver.

When the charged data voltage has a positive polarity, the storage signal may change from a low level to a high level, and when the charged data voltage has a negative polarity, the storage signal may change from the high level to the low level.

The storage signal applied to a given storage electrode line of the plurality of storage electrode lines may be inverted each consecutive frame.

The common voltage may be a fixed voltage.

The plurality of pixels may include a first pixel supplied with a first gate signal, a second pixel adjacent to the first pixel and supplied with a second gate signal and a third pixel adjacent to the first pixel and supplied with a third gate signal.

The plurality of signal generating circuits may include a first signal generating circuit which transmits a first storage signal to a storage electrode line of the first pixel, a second signal generating circuit which transmits a second storage signal to a storage electrode line of the second pixel and a third signal generating circuit which transmits a third storage signal to a storage electrode line of the first pixel.

The second signal generating circuit is supplied with the first gate signal or the third signal, or may be supplied with the second signal in alternative exemplary embodiments of the present invention.

The at least one control signal may include a first control signal, a second control signal and a third control signal. At least one signal generating circuit of the plurality of signal generating circuits may include a signal inputting unit which receives the at least one gate signal and outputs a driving control signal based on the at least one gate signal, a storage signal applying unit which receives the first control signal and transmits the first control signal as a storage signal based on the driving control signal from the signal inputting unit, a controlling unit which receives the second control signal and the third control signal and changes an operation state of the controlling unit in accordance with the driving control signal, and a signal maintaining unit which maintains the storage signal from the storage signal applying unit based on the second control signal or the third control signal applied in accordance with the operation state of the controlling unit.

The signal inputting unit may further receive a first direction signal and a second direction signal, each of has a signal state in accordance with the scanning direction of the gate driver. The first direction signal and the second direction signal may have substantially inverted phases.

The at least one gate signal may include a first gate signal and a second gate signal, and a time difference between a gate-on voltage application time of the first gate signal and a gate-on voltage application time of the second gate signal is about two horizontal periods ("2H").

The signal inputting unit may select one of the first gate signal and the second gate signal in accordance with the first direction signal and the second direction signal, and output the driving control signal based on the selected first gate signal or the selected second gate signal.

The first direction signal and the second direction signal may each maintain a substantially uniform level.

The first direction signal and the second direction signal may have a first level voltage and a second level voltage, respectively, and the first direction signal and the second direction signal may alternate between the first level voltage and the second level voltage each consecutive predetermined period. The predetermined period may be about one horizontal period ("1H").

A phase of the first direction signal applied to a first signal generating circuit of the plurality of signal generating circuits and a phase of the second direction signal applied to a second signal generating circuit of the plurality of signal generating circuits adjacent to the first signal generating circuit may be substantially inverted.

The signal inputting unit may include a first transistor having a control terminal connected to the first direction signal, an input terminal connected to the first gate signal and an output terminal connected to the driving control signal. The signal inputting unit may further include a second transistor having a control terminal connected to the second direction signal, an input terminal connected to the second gate signal and an output terminal connected to the driving control signal.

The at least one gate signal may include a first gate signal and a second gate signal, and a time difference between a gate-on voltage application time of the first gate signal and a gate-on voltage application time of the second gate signal may be about four horizontal periods ("4H").

The signal inputting unit may select one of the first direction signal and the second direction signal in accordance with the first gate signal and the second gate signal, and output the driving control signal based on the selected direction signal.

The first direction signal and the second direction signal may each maintain a uniform level.

The signal inputting unit may further be supplied with a clock signal having a first level voltage and a second level voltage different from the first level voltage, and the clock signal may alternate between the first level voltage and the second level voltage each consecutive predetermined period. The predetermined period may be about two horizontal periods ("2H").

A phase of the clock signal applied to a first signal generating circuit of the plurality of signal generating circuits and a phase of the clock signal applied to a second adjacent signal generating circuit of the plurality of signal generating circuits are substantially inverted.

The signal inputting unit may operate the signal maintaining unit by changing a state of the driving control signal based on the first direction signal or the second direction signal in accordance with the clock signal.

In an alternative exemplary embodiment, the signal inputting unit may include: a first transistor having an input terminal connected to the first direction signal, a control terminal connected to the first gate signal and an output terminal connected to the driving control signal; a second transistor having an input terminal connected to the second direction signal, a control terminal connected to the second gate signal and an output terminal connected to the driving control signal; and a third transistor having an input terminal connected to the gate-off voltage, a control terminal connected to the clock signal and an output terminal connected to the driving control signal.

A voltage level of the storage signal applied to a first storage electrode line of the plurality of storage electrode lines and a voltage level of the storage signal applied to a second adjacent storage electrode line of the plurality of storage electrode lines are substantially the same. A voltage level of the first control signal, a voltage level of the second control signal and a voltage level of the third control signal are substantially uniform in a given frame and are inverted each consecutive frame.

The signal inputting unit may be supplied with a gate clock signal and a clock signal having a first level voltage and a second level voltage different from the first level voltage, and the clock signal may alternate between the first level voltage and the second level voltage each consecutive predetermined period. The predetermined period may be about two horizontal periods ("2H").

A phase of the clock signal applied to a first signal generating circuit of the plurality of signal generating circuits and a phase of the clock signal applied to a second adjacent signal generating circuit of the plurality of signal generating circuits are substantially inverted.

In an alternative exemplary embodiment, the signal inputting unit may operate the signal maintaining unit by changing a state of the driving clock signal which is based on the at least one gate signal in accordance with the clock signal. Further, the signal inputting unit may include a first transistor having a control terminal and an input terminal each connected to the gate signal and an output terminal connected to the driving control signal, and a second transistor having a control terminal connected to the clock signal, an input terminal connected to the gate signal and an output terminal connected to the driving control signal.

The storage signal applying unit may include a first transistor having a control terminal connected to an output terminal of the signal inputting unit, an input terminal connected to the first control signal and an output terminal connected to a storage electrode line.

The controlling unit may include a second transistor having a control terminal connected to the output terminal of the signal inputting unit and an input terminal connected to the second control signal, and a third transistor having a control terminal connected to the output terminal of the signal inputting unit and an input terminal connected to the third control signal.

The signal maintaining unit may include a fourth transistor having a control terminal connected to an output terminal of the third transistor, an input terminal connected to a first driving voltage and an output terminal connected to the storage electrode line, a fifth transistor having a control terminal connected to an output terminal of the second transistor, an input terminal connected to the second driving voltage and an output terminal connected to the storage electrode line. The signal maintaining unit may further include a first capacitor connected between the input terminal and the control terminal of the fourth transistor and a second capacitor connected between the input terminal and the control terminal of the fifth transistor.

A voltage level of a storage signal applied to a first storage electrode line of the plurality of storage electrode lines and a voltage level of a storage signal applied to a second adjacent storage electrode line of the plurality of storage electrode lines are different.

The first control signal, the second control signal and the third control signal may each have a first level voltage and a second level voltage, and a respective level of each of the first control signal, the second control signal and the third control signal may each alternate between the first level voltage and the second level voltage each consecutive predetermined period in given frame. Further, the respective level of each of the first control signal, the second control signal and the third control signal may be inverted every other frame.

The display device according to an exemplary embodiment of the present invention may further include at least one additional gate line which transmits a gate signal to a signal generating circuit of the plurality of signal generating circuits.

A gate-on voltage of a first gate signal transmitted to a first gate line of the plurality of gate lines and a gate-on voltage of a second gate signal transmitted to an adjacent second gate line of the plurality of gate lines temporally overlap each other for at least a portion of a predetermined time period.

A duration of the predetermined time period may be about one horizontal period ("1H").

Yet another exemplary embodiment of the present invention provides a driving method of a liquid crystal display. The liquid crystal display includes a plurality of gate lines which transmits gate signals having a gate-on voltage, a plurality of data lines which transmits data voltages, a plurality of storage electrode lines which transmits storage signals, a plurality of switching elements, each switching element of the of the plurality of switching elements being connected to a gate line of the plurality of gate lines and a data line of the plurality of data lines, a plurality of pixels, each pixel of the plurality of pixels including a storage capacitor connected to a switching element of the plurality of switching elements and a storage electrode line of the plurality of storage electrode lines, a gate driver which generates the gate signals in a first scanning direction or a second scanning direction, and a plurality of signal generating circuits which generates the storage signals.

The driving method includes applying a first gate signal to a first gate line of the plurality of gate lines connected to a first pixel of the plurality of pixels, applying a first data voltage to a first data line of the plurality of data lines connected to the first pixel, applying a second gate signal to a second gate line of the plurality of gate lines connected to a second pixel of the plurality of pixels, and outputting a storage signal to the first pixel based on the second gate signal. An output order of the storage signal changes according to the first scanning direction or the second scanning direction of the gate driver.

An application time of a gate-on voltage of the first gate signal and an application time of a gate-on voltage of the second gate signal are separated from each other by about two horizontal periods ("2H") or, in an alternative exemplary embodiment, by about four horizontal periods ("4H").

In still another exemplary embodiment, a driving method of a liquid crystal display is provided. The liquid crystal display includes a plurality of gate lines which transmits gate signals having a gate-on voltage, a plurality of data lines which transmits data voltages, a plurality of storage electrode lines which transmits storage signals, a plurality of switching elements, each switching element of the plurality of switching elements being connected to a gate line of the plurality of gate lines and a data line of the plurality of data lines, a plurality of pixels, each pixel of the plurality of pixels including a storage capacitor connected to a switching element of the plurality of switching elements and a storage electrode line of the plurality of storage electrode lines, a gate driver which generates the gate signals in a first scanning direction or a second scanning direction, and a plurality of signal generating circuits which generates the storage signals.

The driving method includes applying the gate signal to a gate line of the plurality of gate lines connected to a pixel of the plurality of pixels, applying the data voltage to a data line of the plurality of data lines connected to the pixel, and outputting the storage signal to the pixel based on the gate signal. An output order of the storage signal changes according to the first scanning direction or the second scanning direction of the gate driver.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
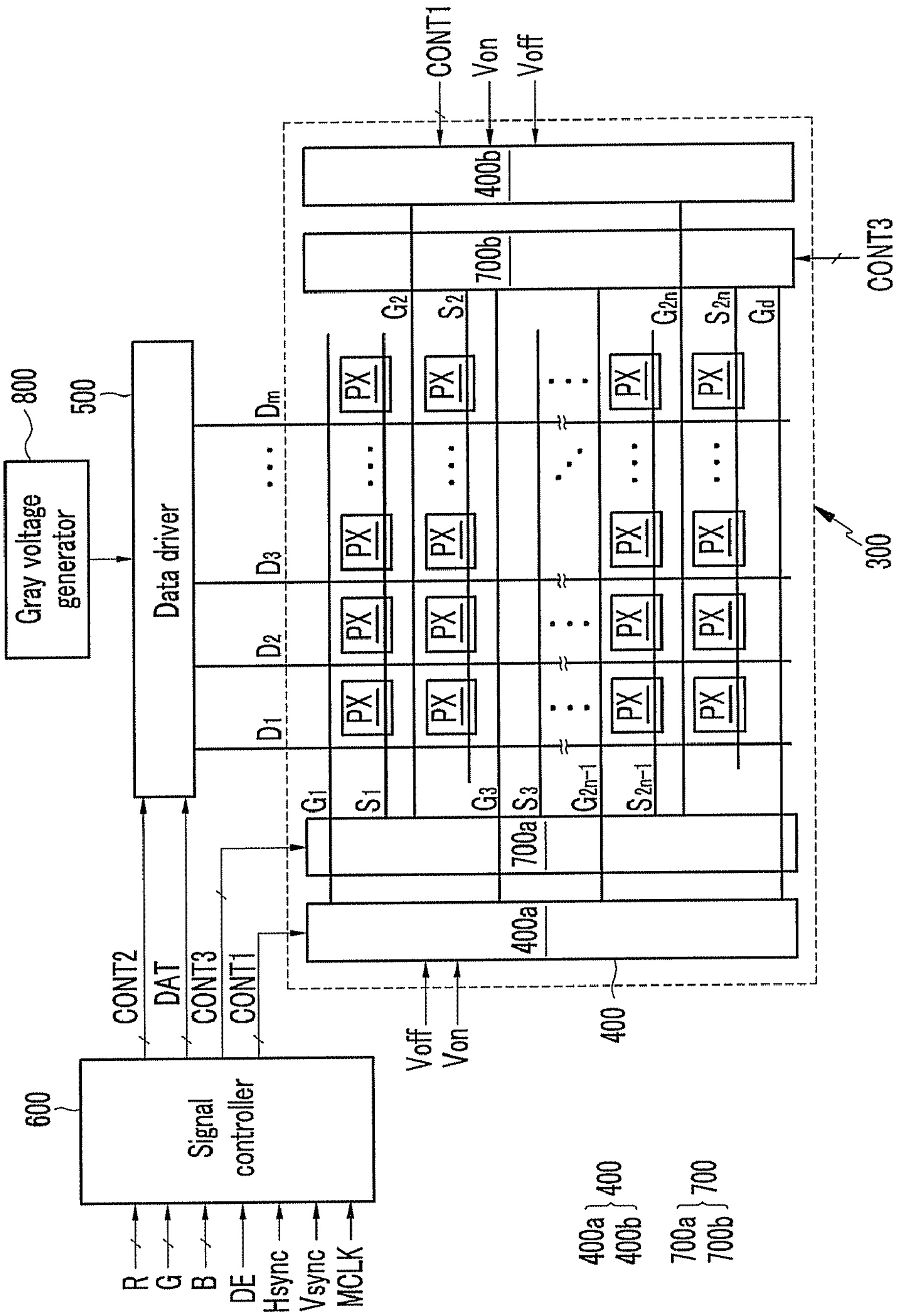
FIG. 1 is a block diagram of a liquid crystal display according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

The present invention will now be described in further detail with reference to the accompanying drawings.

Figure 2:
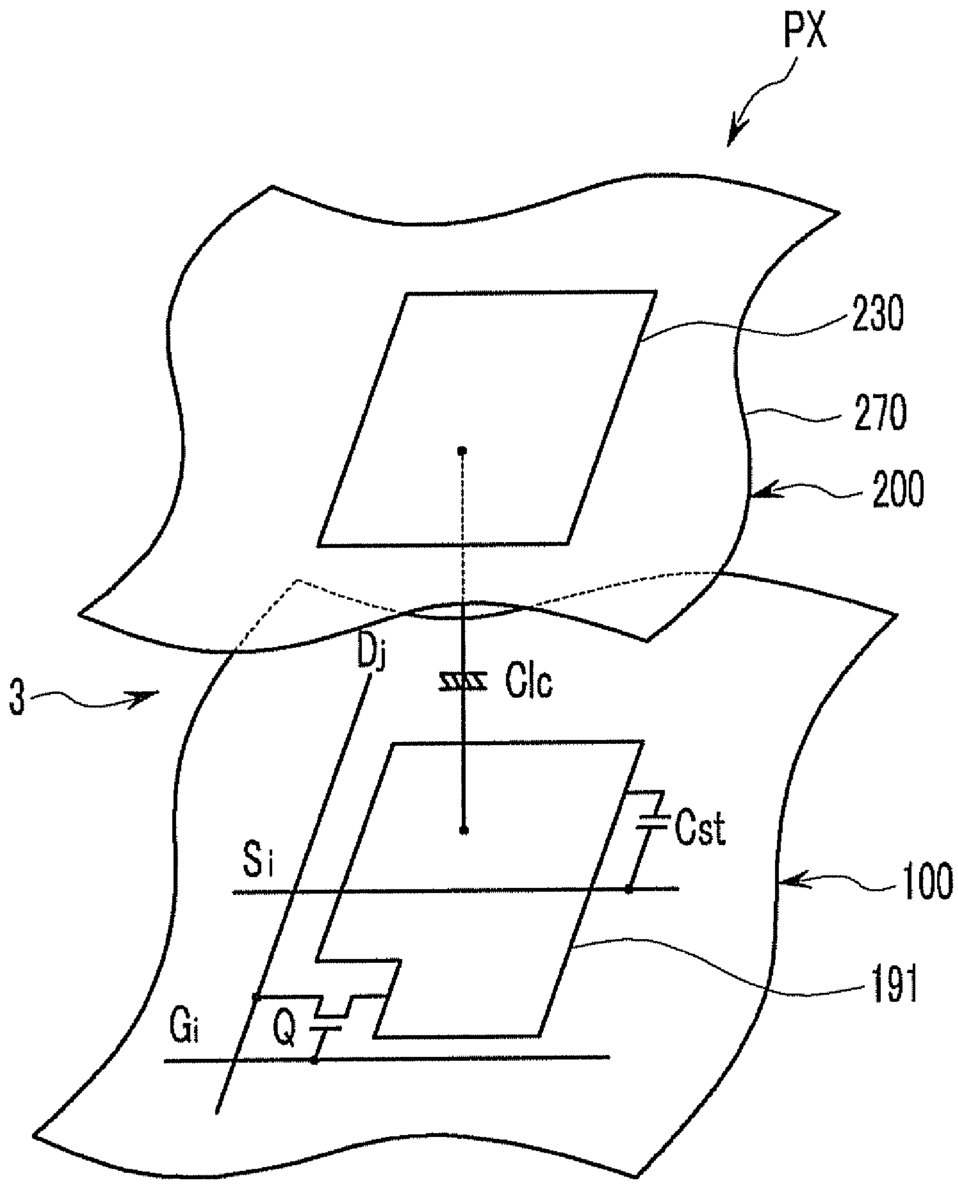
FIG. 2 is an equivalent circuit diagram of a pixel of a liquid crystal display according to an exemplary embodiment of the present invention.

FIG. 1 is a block diagram of a liquid crystal display according to an exemplary embodiment of the invention, and FIG. 2 is an equivalent circuit diagram of a pixel PX of a liquid crystal display according to an exemplary embodiment of the invention.

As shown in FIG. 1, a liquid crystal display ("LCD") according to an exemplary embodiment of the present invention includes a liquid crystal panel assembly 300, a gate driver 400, a data driver 500, a gray voltage generator 800 connected to the data driver 500, a storage signal generator 700 and a signal controller 600 which controls the above elements, for example, but is not limited thereto.

The liquid crystal panel assembly 300 includes a plurality of signal lines ($G_1$-$G_{2n}$, $G_d$, $D_1$-$D_m$, and $S_1$-$S_{2n}$) and a plurality of pixels PX connected to the plurality of signal lines ($G_1$-$G_{2n}$, $G_d$, $D_1$-$D_m$, and $S_1$-$S_{2n}$) and arranged in a substantially matrix pattern.

Referring to FIG. 2, the liquid crystal panel assembly 300 includes a lower panel 100 and an upper panel 200 facing each other and a liquid crystal layer 3 interposed between the lower panel 100 and upper panel 200.

Referring back to FIG. 1, the plurality of signal lines ($G_1$-$G_{2n}$, $G_d$, $D_1$-$D_m$, and $S_1$-$S_{2n}$) includes a plurality of gate lines $G_1$-$G_2$, and $G_d$, a plurality of data lines $D_1$-$D_m$ and a plurality of storage electrode lines $S_1$-$S_{2n}$.

The plurality of gate lines $G_1$-$G_{2n}$ and $G_d$ includes a plurality of normal gate lines $G_1$-$G_{2n}$ and an additional gate line $G_d$ which transmit a gate signal (hereinafter collectively referred to as "scanning signals"). The plurality of storage electrode lines $S_1$-$S_{2n}$ is connected to the plurality of normal gate lines $G_1$-$G_{2n}$ and transmits a storage signal. The plurality of data lines $D_1$-$D_m$ transmits a data voltage.

The plurality of gate lines $G_1$-$G_{2n}$, $G_d$ and the plurality of storage electrode lines $S_1$-$S_{2n}$ extend in a first substantially row direction and are substantially parallel to each other, while the plurality of data lines $D_1$-$D_m$ extend in a second substantially column direction substantially perpendicular to the first direction and substantially parallel to each other.

Referring again to FIG. 2, each pixel PX, for example a pixel PX connected to an i-th normal gate line $G_i$ (i=1, 2, . . . , 2n), an i-th normal storage signal line $S_i$ (i=1, 2, . . . , 2n) and a j-th data line $D_j$ (j=1, 2, . . . , m), includes a switching element Q connected to signal lines $G_i$ and $D_j$, and a liquid crystal capacitor Clc and a storage capacitor Cst connected to the switching element Q and the storage signal line $S_i$.

In an exemplary embodiment, the switching element Q may be implemented as a three-terminal element such as a thin film transistor ("TFT") installed on the lower panel 100, for example, but is not limited thereto. The three-terminal element has a control terminal connected to the normal gate line $G_i$, an input terminal connected to the data line $D_j$, and an output terminal connected to the liquid crystal capacitor Clc and the storage capacitor Cst, as shown in FIG. 2.

A pixel electrode 191 of the lower panel 100 and a common electrode 270 of the upper panel 200 are a first terminal and a second terminal, respectively, of the liquid crystal capacitor Clc. The liquid crystal layer 3 disposed between the pixel electrode 191 and the common electrode 270 acts as a dielectric material. The pixel electrode 191 is connected to the switching element Q. The common electrode 270 is disposed on the entire upper panel 200 and receives a common voltage Vcom (not shown). Alternatively, the common electrode 270 may be formed on the lower panel 100, in which case at least one of the pixel electrode 191 and the common electrode 270 may have a substantially linear shape.

The common voltage Vcom may include, for example, a direct current ("DC") voltage having a predetermined value, but is not limited thereto in alternative exemplary embodiments of the present invention.

The storage capacitor Cst assists the liquid crystal capacitor Clc and is formed by forming the pixel electrode 191 to overlap the storage electrode line $S_i$ with an insulator therebetween.

For color display, each pixel PX may represent one primary color, e.g., spatial division, or, alternatively, each pixel PX may represent different primary colors depending on a given time, e.g., temporal division. Regardless, a desired color is displayed by a spatial or temporal sum of the primary colors, e.g., red, green and blue.

FIG. 2 shows an exemplary embodiment of the present invention wherein spatial division is utilized. as shown in FIG. 2, each pixel PX has a color filter 230 representing one of the primary colors, e.g., one of red, green and blue, on a region of the upper panel 200 corresponding to the pixel electrode 191. In alternative exemplary embodiments of the present invention, the color filter 230 may be formed above or below the pixel electrode 191 of the lower panel 100.

A polarizer (not shown) to polarize light is attached to the liquid crystal panel assembly 300.

Referring back to FIG. 1, the gray voltage generator 800 may generate a full number of gray voltages or a limited number of gray voltages (hereinafter referred to as "reference gray voltages") related to a desired transmittance of the pixels PX. Some (reference) gray voltages have a positive polarity relative to the common voltage Vcom, while other (reference) gray voltages have a negative polarity relative to the common voltage Vcom.

The gate driver 400 includes a first gate driving circuit 400*a* and a second gate driving circuit 400*b* disposed on opposite sides of the liquid crystal panel assembly 300 such as a right side and a left side, for example, but not being limited thereto.

The first gate driving circuit 400*a* is connected to ends of odd-numbered normal gate lines $G_1$, $G_3$, . . . , and $G_{2n-1}$ of the plurality of gate lines $G_1$-$G_{2n}$ and $G_d$ and the additional gate line $G_d$. The second gate driving circuit 400*b* is connected to ends of even-numbered normal gate lines $G_2$, $G_4$, . . . , and $G_{2n}$ of the plurality of gate lines $G_1$-$G_{2n}$ and $G_d$. Alternatively, the second gate driving circuit 400*b* may be connected to ends of the odd-numbered normal gate lines $G_1$, $G_3$, . . . , and $G_{2n-1}$ of the plurality of gate lines $G_1$-$G_{2n}$ and $G_d$ and the additional gate line $G_d$, and the first gate driving circuit 400*a* may be connected to ends of the even-numbered normal gate lines $G_2$, $G_4$, . . . , $G_{2n}$ of the plurality of gate lines $G_1$-$G_{2n}$ and $G_d$.

The first gate driving circuit 400*a* and the second gate driving circuit 400*b* each utilize a gate-on voltage Von and a gate-off voltage Voff to generate the gate signals for application to the plurality of gate lines $G_1$-$G_{2n}$ and $G_d$.

In an exemplary embodiment of the present invention, the gate driver 400 is integrated into the liquid crystal panel assembly 300 along with the plurality of signal lines $G_1$-$G_{2n}$, $G_d$, $D_1$-$D_m$, and $S_1$-$S_{2n}$ and the switching elements Q. In an alternative exemplary embodiment, the gate driver 400 may include at least one integrated circuit ("IC") chip mounted on the liquid crystal panel assembly 300 or on a flexible printed circuit ("FPC") film in a tape carrier package ("TCP"), which is attached to the liquid crystal panel assembly 300. Alternatively, the gate driver 400 may be mounted on a separate printed circuit board (not shown).

The storage signal generator 700 includes a first storage signal generating circuit 700*a* and a second storage signal generating circuit 700*b* arranged on opposite sides of the liquid crystal panel assembly 300 and adjacent to the first gate driving circuit 400*a* and the second gate driving circuit 400*b*, for example, but not being limited thereto.

The first storage signal generating circuit 700*a* is connected to odd-numbered storage electrode lines $S_1$, $S_3$, . . . , and $S_{2n-1}$ and the even-numbered normal gate lines $G_2$, $G_4$, . . . , and $G_{2n}$, and applies the plurality of storage signals having a high level voltage and a low level voltage to the storage electrode lines $S_1$, $S_3$, . . . , and $S_{2n-1}$.

The second storage signal generating circuit 700*b* is connected to even-numbered storage electrode lines $S_2$, $S_4$, . . . , and $S_{2n}$ and the odd-numbered normal gate lines $G_3$, . . . , and $G_{2n-1}$ except for the first normal gate line $G_1$ and the additional gate line $G_d$, and applies the storage signals having the high level voltage and the low level voltage to the storage electrode lines $S_2$, $S_4$, . . . , and $S_{2n}$.

In an alternative exemplary embodiment of the present invention, the storage signal generator 700 may not be supplied with a signal from the additional gate line $G_d$ connected to the gate driver 400. Rather, the storage signal generator 700 may be supplied with a signal from a separate unit such as the signal controller 600 or a separate signal generator (not shown), for example, but is not limited thereto. In this case, the additional gate line $G_d$ may not be formed on the liquid crystal panel assembly 300, as described above.

In an exemplary embodiment of the present invention, the storage signal generator 700 is integrated into the liquid crystal panel assembly 300 along with the plurality of signal lines $G_1$-$G_{2n}$, $G_d$, $D_1$-$D_m$, and $S_1$-$S_{2n}$ and the switching elements Q. In an alternative exemplary embodiment, the storage signal generator 700 may include at least one IC chip mounted on the liquid crystal panel assembly 300 or on an FPC film in a TCP, which is attached to the panel assembly 300. Alternatively, the storage signal generator 700 may be mounted on a separate printed circuit board (not shown).

The data driver 500 is connected to the plurality of data lines $D_1$-$D_m$ of the panel assembly 300 and applies data voltages, which are selected from the gray voltages supplied from the gray voltage generator 800, to the plurality of data lines $D_1$-$D_m$. However, when the gray voltage generator 800 generates only some, rather than all, of the gray voltages, the data driver 500 may divide the reference gray voltages to generate the data voltages from among the gray voltages.

The signal controller 600 controls the gate driver 400, the data driver 500 and the storage signal generator 700.

In one exemplary embodiment, the data driver 500, the signal controller 600, and the gray voltage generator 800 may include at least one IC chip mounted on the liquid crystal panel assembly 300 or on an FPC film in a TCP, which is attached to the panel assembly 300. Alternatively, at least one of the data driver 500, the signal controller 600, and the gray voltage generator 800 may be integrated into the panel assembly 300 along with the plurality of signal lines $G_1$-$G_{2n}$, $G_d$, $S_1$-$S_{2n}$, and $D_1$-$D_m$ and the switching elements Q. In yet another alternative exemplary embodiment, each of the data driver 500, the signal controller 600, and the gray voltage generator 800 may be integrated into a single IC chip, but at least one of the data driver 500, the signal controller 600, and the gray voltage generator 800 or at least one circuit element in at least one of the data driver 500, the signal controller 600, and the gray voltage generator 800 may be disposed outside of the single IC chip.

Still referring to FIGS. 1 and 3, an operation of the liquid crystal display will now be described in further detail.

The signal controller 600 receives input image signals R, G, and B and a plurality of input control signals which controls the input image signals R, G, and B from an outside graphics controller (not shown). The input image signals R, G, and B contain luminance information for the pixels PX, and the luminance has a predetermined number of gray values, such as 1024 ($=2^{10}$), 256 ($=2^8$) or 64 ($=2^6$) gray values, for example, but is not limited thereto.

The plurality of input control signals includes, for example, a vertical synchronization signal Vsync, a horizontal synchronization signal Hsync, a main clock signal MCLK and a data enable signal DE, but is not limited thereto.

The signal controller 600 processes the input image signals R, G, and B based on an input control signal (not shown) and the input image signals R, G, and B, and, according to an operating condition of the liquid crystal panel assembly 300, generates a gate control signal CONT1, a data control signal CONT2 and a storage control signals CONT3, and applies the gate control signal CONT1 to the gate driver 400, the data control signal CONT2 and a digital image signal DAT to the data driver 500, and the storage control signal CONT3 to the storage signal generator 700.

The gate control signal CONT1 include a first scanning start signal STV1 (not shown) and a second scanning start signal STV2 (not shown) which determine a start of the gate-on voltage Von, and at least one clock signal (not shown) which controls an output period of the gate-on voltage Von. In an exemplary embodiment, the first scanning start signal STV1 is applied to the first gate driving circuit 400*a* and the second scanning start signal STV2 is applied to the second gate driving circuit 400*b*. In alternative exemplary embodiments of the present invention, the first scanning start signal STV1 may be applied to the second gate driving circuit 400*b* and the second scanning start signal STV2 may be applied to the first gate driving circuit 400*a*.

The gate control signal CONT1 may further include an output enable signal OE (not shown) which limits a time period of the gate-on voltage Von.

The data control signal CONT2 includes a horizontal synchronization start signal STH (not shown) which determines a start of data transmission for a respective row of pixels PX, a load signal LOAD (not shown) to apply the data voltages to the plurality of data lines $D_1$-$D_m$ and a data clock signal HCLK (not shown). The data control signal CONT2 may further include an inversion signal RVS (not shown) which reverses a polarity of the data voltages relative to the common voltage Vcom.

In response to the data control signal CONT2 from the signal controller 600, the data driver 500 receives the digital image signal DAT for a respective row of pixels PX from the signal controller 600, converts the digital image signal DAT to an analog data voltage selected from the gray voltages, and applies the analog data voltage to the plurality of data lines $D_1$-$D_m$.

The gate driver 400 applies the gate-on voltage Von to corresponding normal gate lines of a current row, e.g., an i-th row of gate lines, in response to the gate control signal CONT1 from the signal controller 600, and thereby turns on the associated switching elements Q which are connected to the respective normal gate lines of the i-th row. Thus, the analog data voltage is applied to the data lines $D_1$-$D_m$ and are then supplied to the respective pixels PX of the i-th row through the turned on switching transistors Q such that the liquid crystal capacitor Clc and the storage capacitor Cst in the pixels PX of the i-th row are charged by the analog data voltage.

In an exemplary embodiment, the additional gate line $G_d$ is not connected to a switching element Q.

The difference between the analog data voltage and the common voltage Vcom applied to a respective pixel PX is represented as a voltage differential across the liquid crystal capacitor Clc of the pixel PX, and is referred to as a pixel voltage. The liquid crystal molecules in the liquid crystal capacitor Clc are oriented depending on a magnitude of the pixel voltage, and the orientation of the liquid crystal molecules determines a polarization of light passing through the liquid crystal layer 3. The polarizer (not shown) converts light polarization to light transmittance such that a given pixel PX has a luminance proportional to a level of the analog data voltage applied to the pixel PX, .e.g., the pixel voltage.

After a horizontal period ("1H") equal to one period of the horizontal synchronization signal Hsync and the data enable signal DE, the data driver 500 applies data voltages to pixels PX of an (i+1)-th row, e.g., a subsequent row, and the gate driver 400 applies the gate-off voltage Voff to the i-th row and applies the gate-on voltage Von to the (i+1)-th row of pixels. As a result, the switching elements Q of the i-th row are turned off to float the pixel electrodes 191 of the i-th row.

The storage signal generator 700 changes a voltage level of a storage signal applied to an i-th storage electrode line $S_i$ based on the storage control signal CONT3 and a voltage variation of the gate signal applied to the (i+1)-th gate line $G_{i+1}$. Thus, a voltage of the pixel electrode 191 connected to one terminal of the storage capacitor Cst varies in accordance with the voltage variation of the storage electrode line $S_i$ connected to another terminal of the storage capacitor Cst.

By repeating the procedure described above for all subsequent pixel rows, the LCD displays an image for a single frame. When a subsequent frame starts, the inversion signal RVS (not shown) applied to the data driver 500 is controlled such that a polarity of the analog data voltages is reversed. Put another way, a polarity of the data voltages of a given frame are the same, but are reversed with respect to a polarity of the data voltages of a previous frame, which is referred to as "frame inversion".

In addition, a polarity of the data voltages applied to pixels PX of one row may be substantially the same, and a polarity of the data voltages applied to pixels PX of a prior adjacent row and a subsequent adjacent row is reversed (e.g., row inversion).

In an exemplary embodiment of the present invention which performs frame inversion and/or row inversion, a polarity of all data voltages applied to pixels PX of one row is positive or negative alternates each consecutive frame. Further, a storage signal applied to the plurality of storage electrode lines $S_1$-$S_{2n}$ changes from a low level voltage to a high level voltage when the pixel electrode 191 is charged by a data voltage of a positive polarity. Conversely, the storage signal is changed from a high level voltage to a low level voltage when the pixel electrode 191 is charged by a data voltage of a negative polarity. As a result, the voltage of the pixel electrode 191 increases if the pixel electrode 191 is charged by a positive data voltage of the positive polarity and decreases if the pixel electrode 191 is charged by a negative data voltage. As a result, a range of the voltage level of the pixel electrode 191 is increased and is thereby greater than a range of the gray voltages which are the basis of the data voltages. As a result, a luminance range is increased without increasing the range of the gray voltages.

The first storage signal generating circuit 700*a* and the second storage signal generating circuit 700*b* include a plurality of signal generating circuits 710 (FIG. 3) connected to the plurality of storage electrode lines $S_1$-$S_{2n}$. An example of a signal generating circuit 710 will now be described in further detail with reference to FIGS. 3 and 4.

Figure 3:
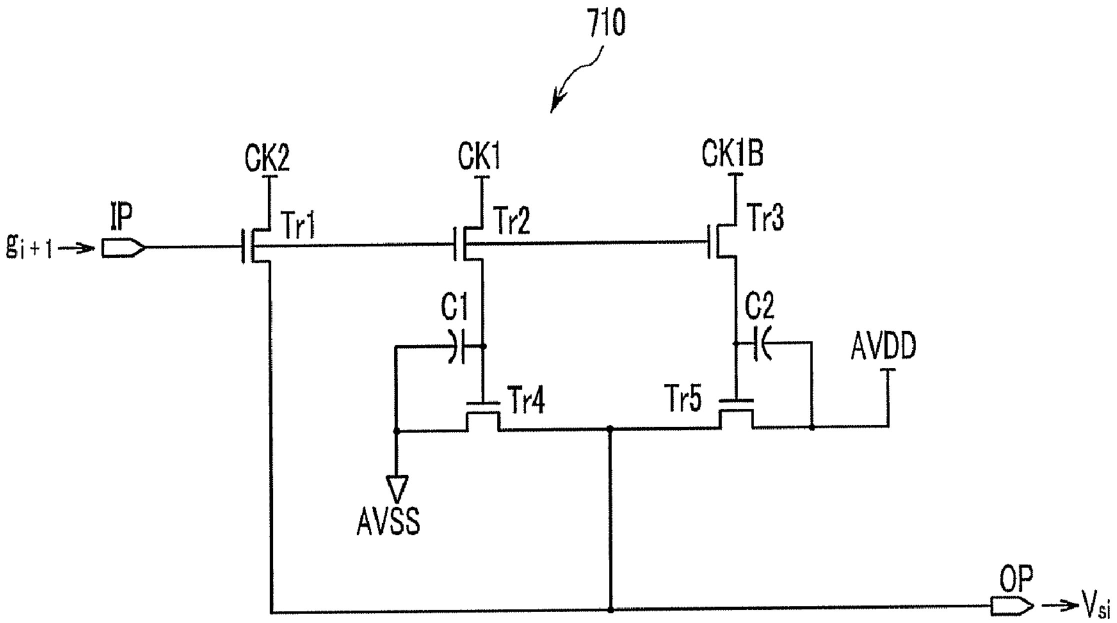
FIG. 3 is a schematic circuit diagram of a signal generating circuit according to an exemplary embodiment of the invention.
Figure 4:
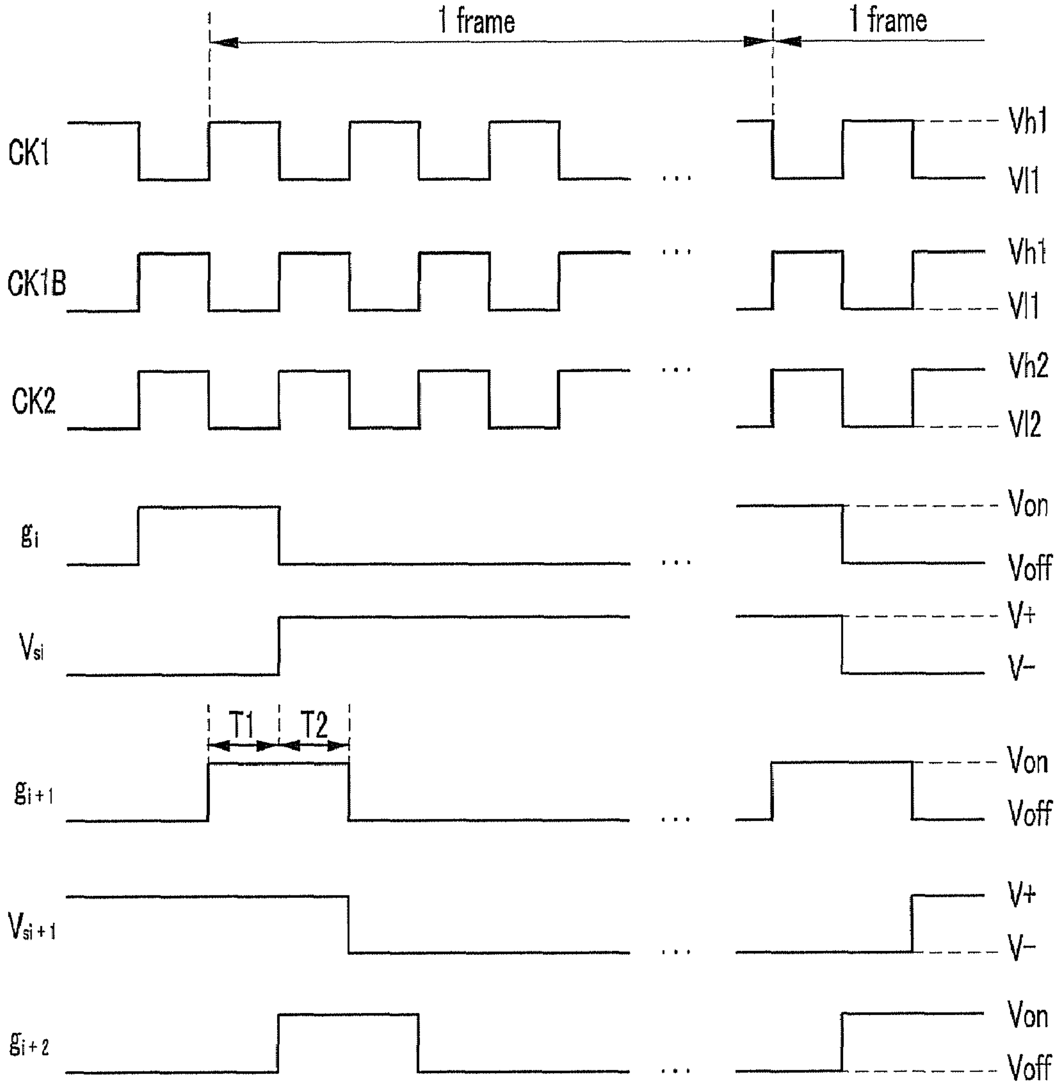
FIG. 4 is a signal timing diagram of the signal generating circuit according to the exemplary embodiment of the present invention in FIG. 3.

FIG. 3 is a schematic circuit diagram of a signal generating circuit according to an exemplary embodiment of the invention, and FIG. 4 is a signal timing diagram of the signal generating circuit according to the exemplary embodiment of the present invention in FIG. 3.

Referring to FIG. 3, a signal generating circuit 710 includes an input terminal IP and an output terminal OP. In an i-th signal generating circuit 710, for example, the input terminal IP is connected to an (i+1)-th gate line $G_{i+1}$ (FIG. 1) to be supplied with an (i+1)-th gate signal $g_{i+1}$ (hereinafter referred to as "an input signal"), and the output terminal OP is connected to an i-th storage electrode line $S_i$ to output an i-th storage signal $V_{si}$. Similarly, in an (i+1)-th signal generating circuit 710, for example, the input terminal IP is connected to an (i+2)-th gate line $G_{i+2}$ to be supplied with an (i+2)-th gate signal $g_{i+2}$ (not shown) as an input signal, and the output terminal OP is connected to an (i+1)-th storage electrode line $S_{i+1}$ to output an (i+1)-th storage signal $V_{si+1}$ (not shown).

The signal generating circuit 710 is supplied with a first clock signal CK1, a second clock signal CK1B and a third clock signal CK2 of the storage control signal CONT3 from the signal controller 600 (FIG. 1), and is supplied with a high voltage AVDD and a low voltage AVSS from the signal controller 600 or an outside device (not shown).

As shown in FIG. 4, a period of the first clock signal CK1, the second clock signal CK1B and the third clock signal CK2 may be about 2H, and a duty ratio thereof may be about 50%, but is not limited thereto. The first clock signal CK1 and the second clock signal CK1B have a phase difference of about 180 degrees and are each inverted relative to the other. In contrast, the second clock signal CK1B and the third clock signal CK2 have substantially the same phase. In addition, each phase of the first clock signal CK1, the second clock signal CK1B and the third clock signal CK2 is reversed in each respective subsequent frame, as shown in FIG. 4.

The first clock signal CK1 and the second clock signal CK1B may have a first high level voltage Vh1 of about 15V, for example, and a first low level voltage Vl1 of about 0V, for example. The third clock signal CK2 may have a second high level voltage Vh2 of about 5V, for example, and a second low level voltage Vl2 of about 0V, for example. The high voltage AVDD may be about 5V, for example, and may be about equal to the second high level voltage Vh2 of the third clock signal CK2. The low voltage AVSS may be about 0V, for example, and may be about equal to the second low level voltage Vl2 of the third clock signal CK2.

The signal generating circuit 710 includes first through fifth transistors Tr1 through Tr5, respectively, each having a control terminal, an input terminal and an output terminal, and a first capacitor C1 and a second capacitor C2.

The control terminal of the first transistor Tr1 is connected to the input terminal IP, the input terminal of the transistor Tr1 is connected to the third clock signal CK2 and the output terminal of the transistor Tr1 is connected to the output terminal OP.

The control terminals of the second transistor Tr2 and the third transistor Tr3 are each connected to the input terminal IP, and the input terminals of the second transistor Tr2 and the third transistor Tr3 are each connected to the first clock signal CK1 and the second clock signal CK1B, respectively.

The control terminals of the fourth transistor Tr4 and the fifth transistor Tr5 are each connected to the output terminals of the second transistor Tr2 and the third transistor Tr3, respectively, and the input terminals of the fourth transistor Tr4 and the fifth transistor Tr5 are connected to the low voltage AVSS and the high voltage AVDD, respectively.

The first capacitor C1 and the second capacitor C2 are connected between the control terminals of the fourth transistor Tr4 and the fifth transistor Tr5 and the low voltage AVSS and the high voltage AVDD, respectively.

In one exemplary embodiment, the first though fifth transistors Tr1 through Tr5, respectively, may be formed from an amorphous silicon ("a-Si") or a polycrystalline silicon ("p-Si") TFT.

Operation of the signal generating circuit 710 will now be described in further detail.

Referring again to FIG. 4, in general, the gate-on voltage Von is applied to each of two adjacent gate lines for an overlapped predetermined time period, such as about 1H, for example, but is not limited thereto. As a result, all of pixels PX of a given row are charged with data voltages which are applied to pixels of an immediately previous row for about 1H, and are then charged with data voltages for the remaining 1H to display images.

Now, an i-th signal generating circuit 710 will be described in further detail with reference to FIGS. 3 and 4.

When an input signal, e.g., a gate signal $g_{i+1}$ applied to an (i+1)-th gate line $G_{i+1}$, is changed to a gate-on voltage Von, the first, second, and third transistors Tr1-Tr3, respectively, are turned on. The turned on first transistor Tr1 transmits the third clock signal CK2 to the output terminal OP. As a result, the i-th storage signal $V_{si}$ is at the second low level voltage Vl2 of the third clock signal CK2. The turned on second transistor Tr2 transmits the first clock signal CK1 to the control terminal of the fourth transistor Tr4, and the turned on third transistor Tr3 transmits the second clock signal CK1B to the control terminal of the fifth transistor Tr5.

Since the first and second clock signals CK1 and CK1B, respectively, have an inverse relationship, the fourth transistor Tr4 and the fifth transistor Tr5 are oppositely biased at a given time. For example, when the fourth transistor Tr4 is on, the fifth transistor Tr5 is off, and, conversely, when the fourth transistor Tr4 is off, the fifth transistor Tr5 is on. Further, when the fourth transistor Tr4 is on and the fifth transistor Tr5 is off, the low voltage AVSS is transmitted to the output terminal OP, and when fourth transistor Tr4 is off and the fifth transistor Tr5 is on, the high voltage AVDD is transmitted to the output terminal OP.

The gate signal $g_{i+1}$ is at the gate on voltage Von, for example, for a duration of about 2H, as shown in FIG. 4. Further, a first period of about 1H is denoted by a first period T1 and a second period of about 1H is denoted by a subsequent period T2.

The first clock signal CK1 is at the first high level voltage Vh1 for the first period T1, and the second and third clock signals CK1B and CK2, respectively, are at the first and second low level voltages Vl1 and Vl2, respectively, and the output terminal OP to which the second low level voltage Vl2 of the third clock signal CK2 is transmitted by the transistor Tr1 is supplied with the low voltage AVSS. As a result, the storage signal $V_{si}$ maintains a low level storage signal voltage V− having a magnitude equal to that of the second low level voltage Vl2 and the low voltage AVSS. During the first period T1, a voltage difference between the first high level voltage Vh1 of the first clock signal CK1 and the low voltage AVSS is charged into the capacitor C1, and a voltage difference between the low level voltage Vl1 of the second clock signal CK1B and the high voltage AVDD is charged into the capacitor C2.

During the period T2, the first clock signal CK1 maintains the first low level voltage Vl1, and the second and third clock signals CK1B and CK2, respectively, maintain the first and second high level voltages Vh1 and Vh2, respectively, and the fifth transistor Tr5 is thereby turned on and the fourth transistor Tr4 is thereby turned off.

As a result, the output terminal OP is supplied with the second high level voltage Vh2 of the third clock signal CK2 transmitted through the turned on first transistor Tr1 and a state of the storage signal $V_{si}$ is changed from the low level storage signal voltage V− to a high level storage signal voltage V+ having a magnitude equal to that of the second high level voltage Vh2. In addition, the output terminal OP is supplied with the high voltage AVDD applied through the turned on fifth transistor Tr5, which has a magnitude equal to that of the high level storage signal voltage V+.

Since a voltage charged into the capacitor C1 is substantially the same as the voltage difference between the first low level voltage Vl1 of the first clock signal CK1 and the low voltage AVSS, the capacitor C1 is discharged when the first low level voltage Vl1 of the first clock signal CK1 and the low voltage AVSS become substantially the same as each other. Since a voltage charged into the capacitor C2 is based on the voltage difference between the first high level voltage Vh1 of the second clock signal CK1B and the high voltage AVDD, the voltage charged into the capacitor C2 is not equal to 0V when the first high level voltage Vh1 and the high voltage AVDD are different from each other, as described above, wherein the first high level voltage Vh1 of the second clock signal CK1B is about 15V and the high voltage AVDD is about 5V. Thus, a voltage of about 10V is charged into the capacitor C2.

When the i+1th stage of the gate signal $g_{i+1}$ is changed from the gate-on voltage Von to the gate-off voltage Voff after the period T2 elapses, as shown in FIG. 4, the first through third transistors Tr1-Tr3, respectively, are turned off. As a result, an electrical connection between the first transistor Tr1 and the output terminal OP is isolated, as well as the control terminals of the fourth and fifth transistors Tr4 and Tr5, respectively.

Since the capacitor C1 is not charged, the fourth transistor TR4 remains in a turned off state. However, the voltage between the first high level Vh1 of the second clock signal CK1B and the high voltage AVDD has been charged into the capacitor C2. Thus, while the charged voltage of capacitor C2 is greater than a threshold voltage of the fifth transistor Tr5, the transistor Tr5 remains in a turned on state. As a result, the high voltage AVDD is provided to the output terminal OP as storage signal $V_{si}$. Accordingly, the storage signal $V_{si}$ maintains the high level storage signal voltage V+.

Next, the operation of the (i+1)-th signal generating circuit 710 will be described in further detail with reference to FIG. 4.

When an (i+2)-th gate signal $g_{i+2}$ having a gate-on voltage Von is applied to the (i+1)-th signal generating circuit 710 (not shown), the (i+1)-th signal generating circuit 710 operates.

As shown in FIG. 4, when the (i+2)-th gate signal $g_{i+2}$ switches to the gate-on voltage Von, the states of the first, second, and third clock signals CK1, CK1B, and CK2, respectively, reverse and the (i+1)-th gate signal gi+1 is at the gate-on voltage Von.

Operation for the first gate-on voltage period T1 of the (i+2)-the gate signal $g_{i+2}$ is substantially the same as that of the latter gate-on period T2 of the (i+1)-the gate signal $g_{i+1}$ such that the first, third and fifth transistors Tr1, Tr3, and Tr5, respectively, are turned on. Accordingly, the second high level voltage Vh2 of the third clock signal CK2 and the high voltage AVDD are applied to the output terminal OP. As a result, the storage signal $V_{si+1}$ is at a high level storage signal voltage V+.

Similarly, operation for the gate-on voltage period T2 of the (i+2)-the gate signal $g_{i+2}$ is substantially the same as that of the first gate-on period T1 of the (i+1)-the gate signal $g_{i+1}$ such that the first, second and fourth transistors Tr1, Tr2, and Tr4, respectively, are turned on. Accordingly, the second low level voltage Vl2 of the third clock signal CK2 and the low voltage AVSS are applied to the output terminal OP, and the storage signal $V_{si+1}$ is changed from the high level storage signal voltage V+ to the low level storage signal voltage V−.

As described above, the first transistor Tr1 may apply the third clock signal CK2 as a storage signal while an input signal maintains the gate-on voltage Von, and the second through fifth transistors Tr2-Tr5, respectively, may maintain a state of the storage signal until the next frame using the first and second capacitors C1 and C2, respectively, when the output terminal OP is isolated from the output terminal of the first transistor Tr1 by the gate-off voltage Voff. Further, the first transistor Tr1 may apply a storage signal to a corresponding storage electrode line, and the second through fifth transistors Tr2-Tr5, respectively, maintain the storage signal.

In one exemplary embodiment, a size of the first transistor Tr1 is much larger than that of the second through fifth transistors Tr2-Tr5, respectively.

A pixel electrode voltage Vp varies in response to a voltage variation of the storage signal $V_s$ as set forth in Equation 1.

$$Vp=V_D+/-\Delta=V_D+/-C_{st}/(C_{st}+C_{lc})*[(V+)-(V-)] \quad \text{(Equation 1)}$$

wherein: $V_D$ is a data voltage; A is a voltage variation; $C_{lc}$ and $C_{st}$ represent capacitances of storage and liquid crystal capacitors, respectively; V+ represents a high level storage signal voltage of a storage signal $V_s$; and V− represents a low level storage signal voltage of a storage signal $V_s$.

By adding the voltage variation Δ of the storage signal $V_s$ to a data voltage $V_D$ or subtracting the voltage variation Δ of the storage signal $V_s$ from the data voltage $V_D$, the pixel electrode voltage Vp increases by the voltage variation Δ when a pixel has been charged with a data voltage of a positive polarity, and, in contrast, the pixel electrode voltage Vp decreases by the voltage variation Δ when a pixel has been charged with a data voltage of a negative polarity. As a result, the voltage variation Δ of the pixel voltage causes the pixel voltage to become greater than a range of a gray voltage by the increased or decreased pixel electrode voltage Vp such that a range of the represented luminance also increases.

Further, as described above, since a common voltage is fixed at a predetermined value, a power consumption is effectively reduced in comparison with LCDs of the prior art in which a common voltage alternates between a high value and a low value.

Thus, according to exemplary embodiments of the present invention, a common voltage is fixed at a predetermined value, and a storage signal of which a level is periodically changed is applied to a storage electrode line such that a range of pixel electrode voltages increases. Thus, a range of voltages for representing gray voltages increases to improve image quality of an LCD.

Further, power consumption is reduced due to the constant common voltage, as described above.

Hereinafter, another exemplary embodiment of the present invention will be described in further detail with reference to FIGS. 5 to 8B.

Figure 5:
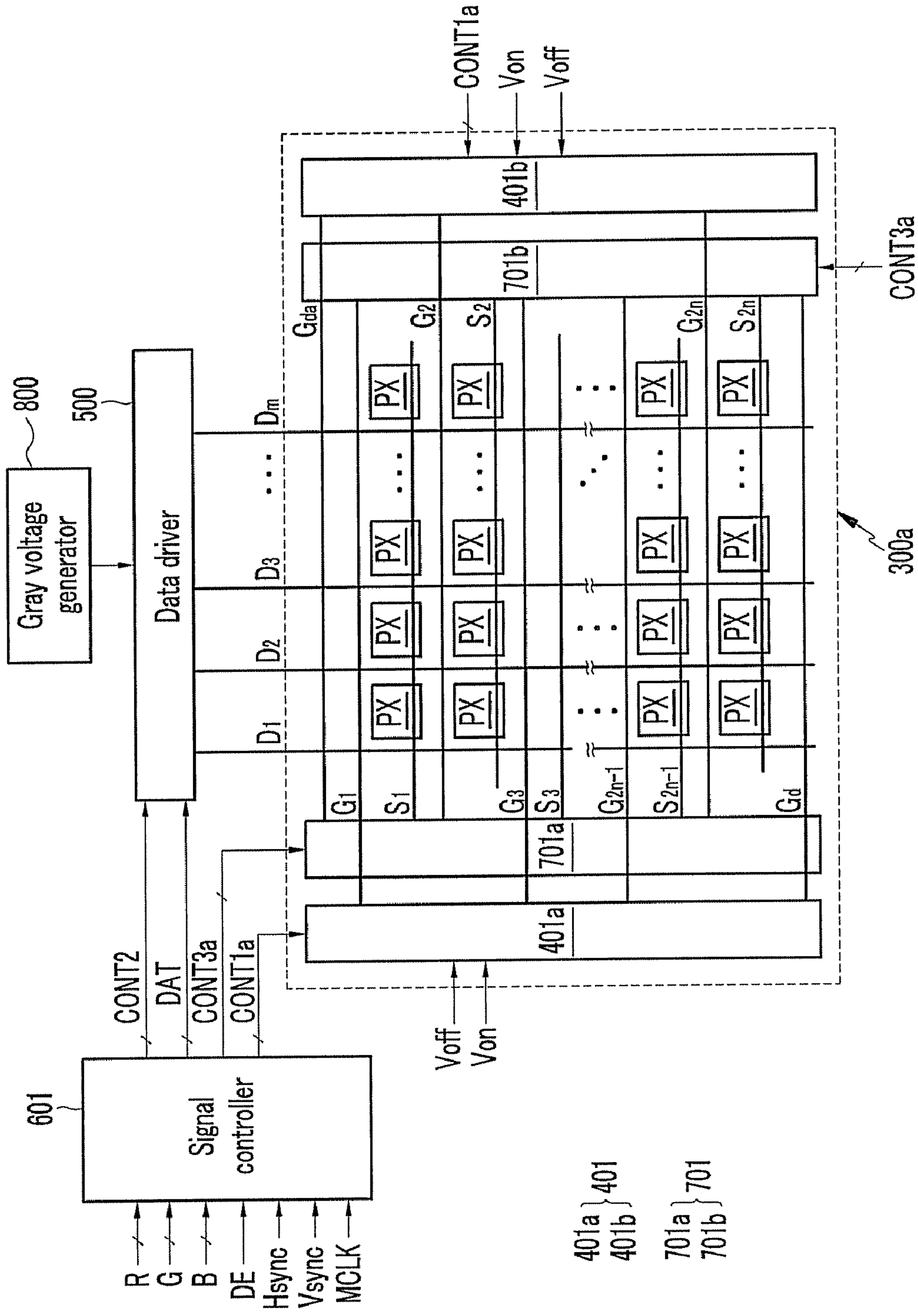
FIG. 5 is a block diagram of a liquid crystal display according to another exemplary embodiment of the present invention.
Figure 6:
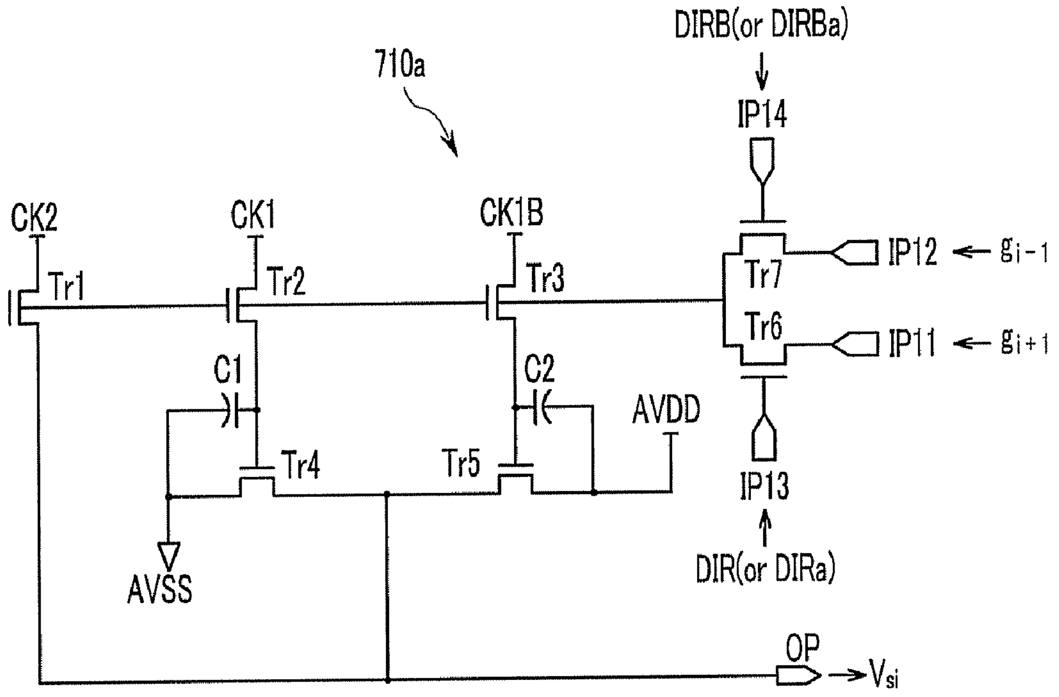
FIG. 6 is a schematic circuit diagram of a signal generating circuit of the storage signal generating circuit according to the exemplary embodiment of the present invention in FIG. 5.
Figure 7A:
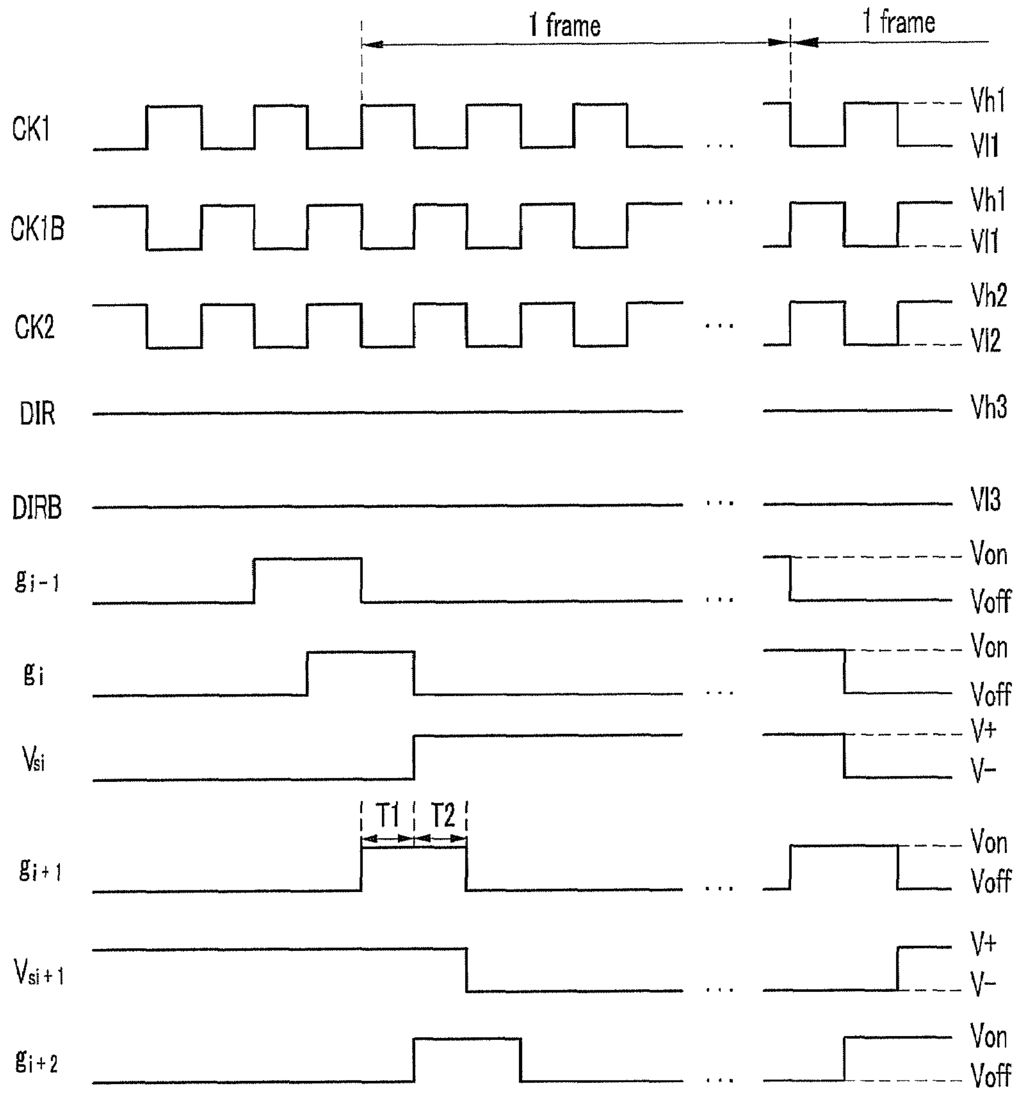
FIGS. 7A and 7B are signal timing diagrams of the signal generating circuit according to the exemplary embodiment of the present invention in FIG. 6.
Figure 7B:
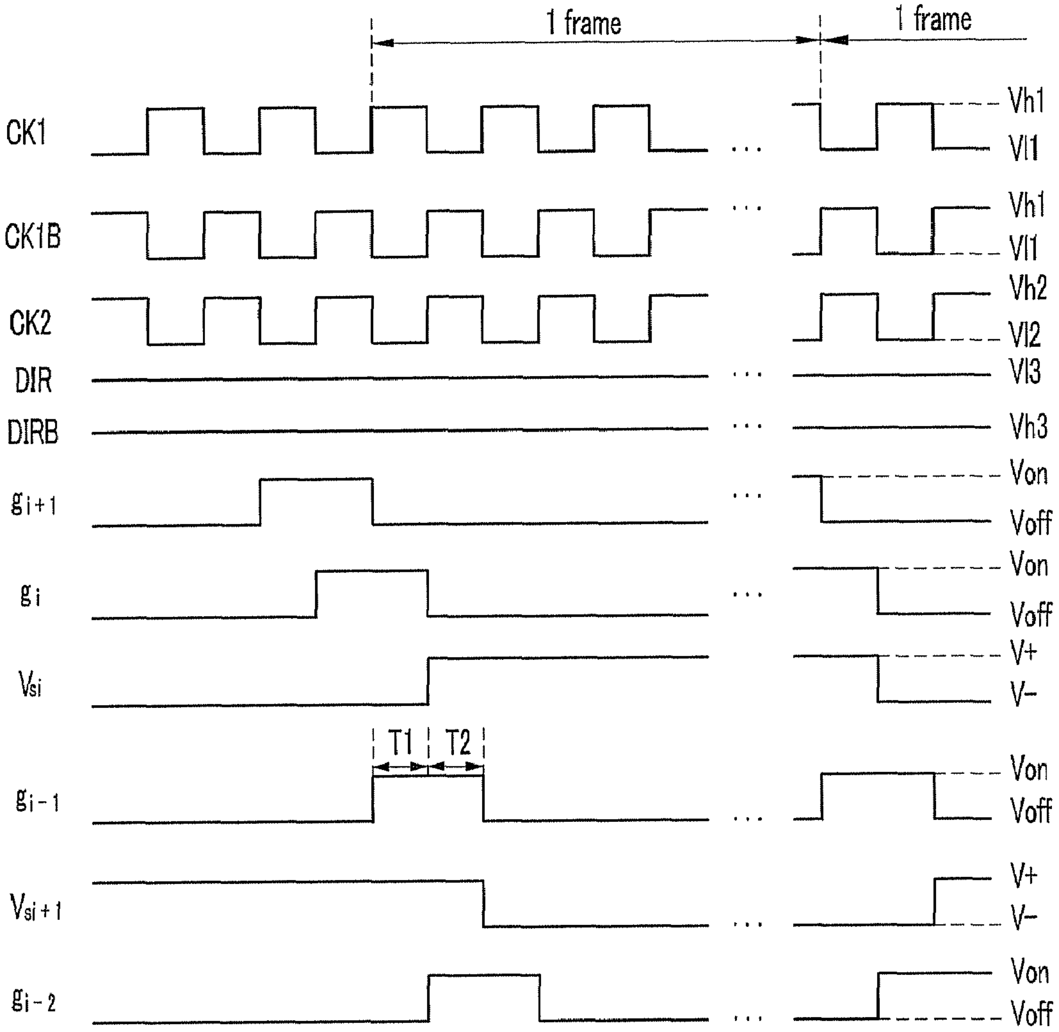
Figure 8A:
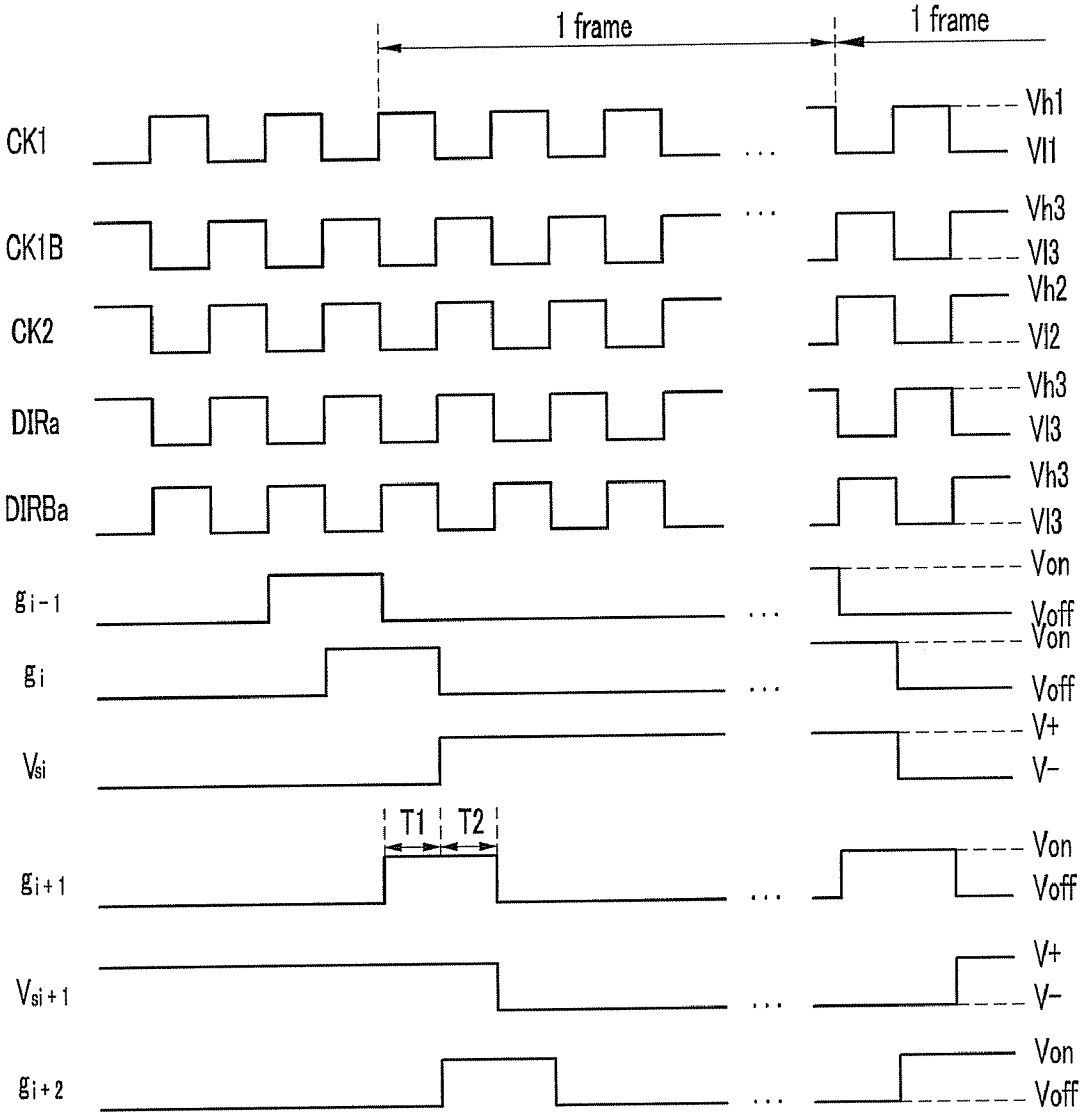
FIGS. 8A and 8B are signal timing diagrams of the signal generating circuit according to an alternative exemplary embodiment of the present invention.
Figure 8B:
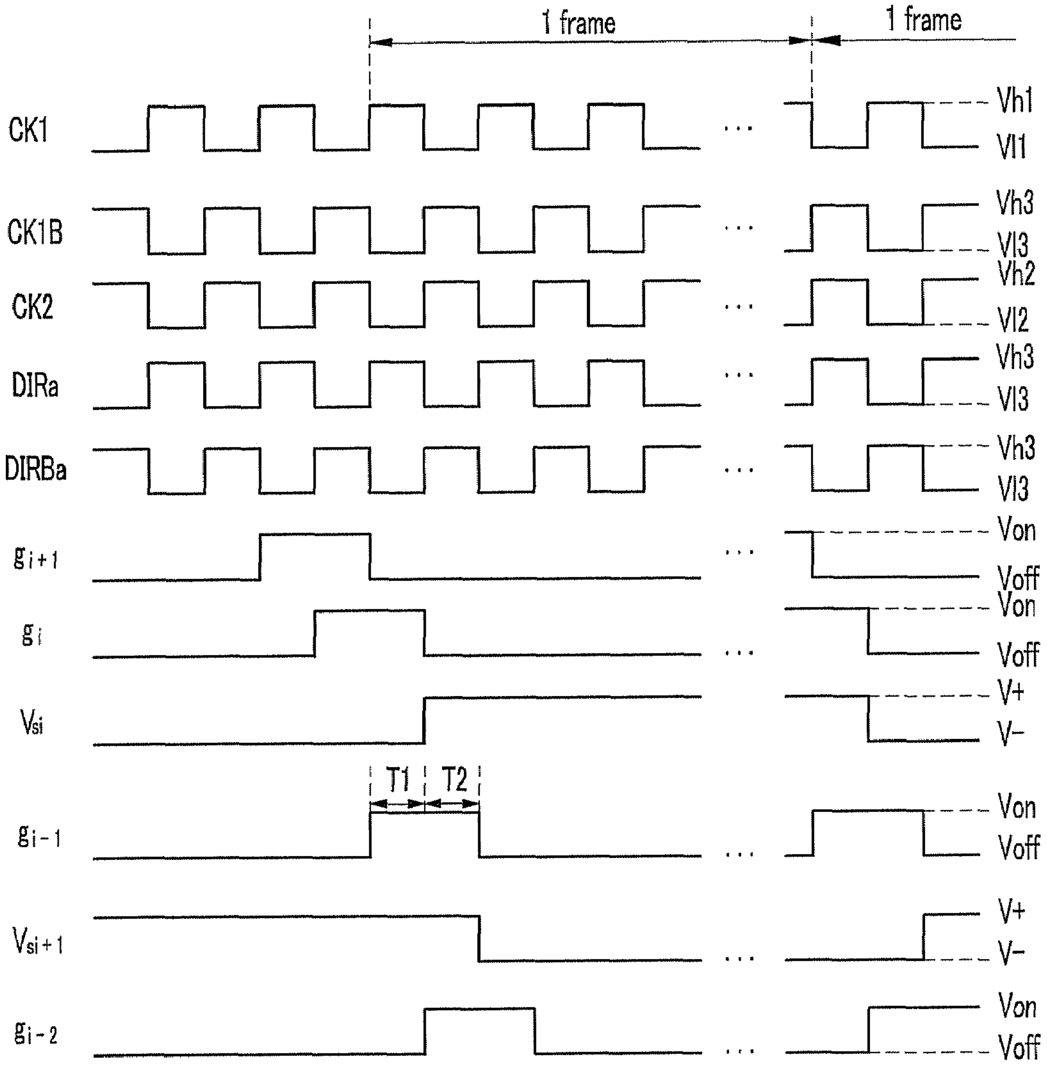

FIG. 5 is a block diagram of a liquid crystal display according to another exemplary embodiment of the present invention, and FIG. 6 is a schematic circuit diagram of a signal generating circuit of the storage signal generating circuit according to the exemplary embodiment of the present invention in FIG. 5. FIGS. 7A and 7B are signal timing diagrams of the signal generating circuit according to the exemplary embodiment of the present invention in FIG. 6. More specifically, FIG. 7A is an example when a scanning direction of a gate driver is a forward direction, and FIG. 7B is an example when a scanning direction of a gate driver is a reverse direction. FIGS. 8A and 8B are signal timing diagrams of the signal generating circuit according to an alternative exemplary embodiment of the present invention. More specifically, FIG. 8A is an example illustrating signal timings when a scanning direction of a gate driver is a forward direction, and FIG. 8B is an example illustrating signal timings when a scanning direction of a gate driver is a reverse direction.

Except for variations described in further detail below, the LCD according to the exemplary embodiment of the present invention shown in FIGS. 5 through 8B is substantially the same as the LCD shown in FIGS. 1 through 3. Therefore, elements performing the same or similar operations are labeled with the same reference numerals, and any repetitive descriptions thereof will be omitted below.

A liquid crystal display according to an exemplary embodiment of the present invention shown in FIG. 5 includes a liquid crystal panel assembly 300*a*, a gate driver 401, a data driver 500, a gray voltage generator 800 connected to the data driver 500, a storage signal generator 701, and a signal controller 601.

However, unlike the exemplary embodiment of the present invention shown in FIG. 1, the gate driver 401 is a bi-directional gate driver of which a scanning direction of a plurality of normal gate lines $G_1$-$G_{2n}$ changes in accordance with a selection signal (not shown) from an outside device (not shown). More specifically, based on a state of the selection signal, the gate driver 401 sequentially transmits a gate-on voltage Von in a forward direction, e.g., from the first normal gate line $G_1$ to the final normal gate line $G_{2n}$, or, in contrast, in a reverse direction, e.g., from the last normal gate line $G_n$ to the first normal gate line $G_1$. In the bi-directional driving of the gate driver 401, the liquid crystal display may further include a selection switch (not shown) which outputs the selection signal having a state which is varied by a selection of a user input to the signal controller 601, for example, and the signal controller 601 may output additional third and fourth scanning start signals STV3 and STV4, respectively (not shown), to a gate control signal CONT1*a*, as well as first and second scanning start signals STV1 and STV2 (not shown), respectively, applied to the first and second gate driving circuits 401*a* and 401*b*, respectively, as described in greater detail above. Thus, when the gate driver 401 scans in the forward direction, the first and second scanning start signals STV1 and STV2, respectively, may be applied to the first and second gate driving circuits 401*a* and 401*b*, respectively, and when the gate driver 401 scans in the reverse direction, the third and fourth scanning start signals STV3 and STV4, respectively, may be applied to the first and second gate driving circuits 401*a* and 401*b*, respectively.

Each of first and second storage signal generating circuits 701*a* and 701*b* of the storage signal generator 701 of the liquid crystal display according to an exemplary embodiment includes a plurality of signal generating circuits 710*a* to transmit storage signals to the plurality of storage electrode lines $S_1$-$S_{2n}$. Each signal generating circuit 710*a* of the plurality of signal generating circuits 710*a* is similar to the signal generating circuit 710 shown in FIG. 3 as shown in FIG. 6, e.g., the signal generating circuit 710*a* includes an output terminal OP, first through fifth transistors Tr1 through Tr5, respectively, and a first capacitor C1 and a second capacitor C2.

However, the signal generating circuit 710*a* of the exemplary embodiment in FIG. 6 further includes a first input terminal IP11 and a second input terminal IP12, and a first direction control terminal IP13 and a second direction control terminal IP14. In an i-th signal generating circuit 710*a*, the first input terminal IP11 is connected to an (i+1)-th gate line $G_{i+1}$ to be supplied with an (i+1)-th gate signal $g_{i+1}$ (hereinafter referred to as a "first input signal"), and the second input terminal IP12 is connected to an (i−1)-th gate line $G_{i-1}$ to be supplied with an (i−1)-th gate signal $g_{i-1}$ (hereinafter referred to as a "second input signal"). Similarly, in an (i+1)-th signal generating circuit 710*a*, the first input terminal IP11 is connected to an (i+2)-th gate line $G_{i+2}$ to be supplied with an (i+2)-th gate signal $g_{i+2}$ as a first input signal, and the second input terminal IP12 is connected to an i-th gate line $G_i$ to be supplied with an i-th gate signal $g_i$ as a second input signal.

Like the signal generating circuit 710 shown in FIG. 3, the signal generating circuit 710*a* is supplied with first, second and third clock signals CK1, CK1B and CK2, respectively, of a storage control signal CONT3*a* from the signal controller 601, and is also supplied with a high voltage AVDD and a low voltage AVSS from the signal controller 601 or an outside device (not shown). The signal generating circuit 710*a* is further supplied with a first direction signal DIR or DIRa and a second direction signal DIRB or DIRBa, of the storage control signal CONT3*a* from the signal controller 601, through the first direction control signal terminal IP13 and the second direction control terminal IP14, respectively.

The signal generating circuit 710*a* further includes a sixth transistor Tr6 and a seventh transistor Tr7 each of which has a control terminal, an input terminal and an output terminal.

As shown in FIG. 6, the control terminal of the sixth transistor Tr6 is connected to the first direction control terminal IP13, the input terminal of the sixth transistor Tr6 is connected to the first input terminal IP11 and the output terminal of the sixth transistor Tr6 is connected to the control terminals of the first through third transistors Tr1 through Tr3, respectively.

Further, the control terminal of the seventh transistor Tr7 is connected to the second direction control terminal IP14, the input terminal of the seventh transistor Tr7 is connected to the second input terminal IP12 and the output terminal of the seventh transistor Tr7 is connected to the control terminals of the first through third transistors Tr1 through Tr3, respectively.

The liquid crystal display further includes a second additional gate line $G_{da}$ as well as an additional gate line $G_d$. The second additional gate line $G_{da}$ is connected to an end of the second gate driving circuit 401*b* to transmit a gate-on voltage Von to the first storage signal generating circuit 701*a* after a gate signal $g_1$ is transmitted.

In exemplary embodiment, neither the additional gate line $G_{da}$ nor the additional gate line $G_d$ are connected to switching elements Q.

An example of an operation of the signal generating circuit will be described in further detail with reference to FIGS. 7A and 7B.

As shown in FIGS. 7A and 7B, the first and second direction signals DIR and DIRB, respectively, applied to the first and second direction control terminals IP13 and IP14, respectively, maintain a third high level voltage Vh3 or a third low level voltage Vl3 for one frame, and the first and second direction signals DIR and DIRB, respectively, have phases which are inverted relative to each other. More specifically, when the first direction signal DIR has the third high level voltage Vh3, the second direction signal DIRB has the third low level voltage Vl3, and when the first direction signal DIR has the third low level voltage Vl3, the second direction signal DIRB has the third high level voltage Vh3. Further, the third high level voltage Vh3 of the first and second direction signals DIR and DIRB, respectively, has a magnitude which turns on the sixth and seventh transistors Tr6 and Tr7, respectively, and a magnitude the third high level voltage Vh3 may be about 15V, for example, but is not limited thereto. The third low level voltage Vl3 of the first and second direction signals DIR and DIRB, respectively, has a magnitude which turns off the sixth and seventh transistors Tr6 and Tr7, respectively, and a magnitude of the third low level voltage Vl3 may be about −10V, for example, but is not limited thereto.

Thus, the sixth and seventh transistors Tr6 and Tr7, respectively, have opposite biases to each other at a given time, whereby when the sixth transistor Tr6 is in a turned-on state, the seventh transistor Tr7 is in a turned-off state, and when the sixth transistor Tr6 is in a turned-off state, the seventh transistor Tr7 is in a turned-on state.

The first and second direction signals DIR and DIRB, respectively, may be outputted based on the selection signal, or may be outputted using a control signal which controls the scanning direction of the gate driver 401, for example, but is not limited thereto in alternative exemplary embodiments of the present invention.

Operation of the signal generating circuit 710*a* will now be described in further detail for a situation in which the scanning direction of the gate driver 401 is the forward direction.

Referring to FIGS. 6 and 7A, the first direction signal DIR is at the third high level voltage Vh3 to input to the first direction control terminal IP13, and the second direction signal DIRB is at the low third level voltage Vl3 to input to the second direction control terminal IP14.

Thus, the sixth transistor Tr6 is turned on and the seventh transistor Tr7 is turned off, and the signal generating circuit 710*a* is thereby operated according to a first input signal, e.g., a gate signal $g_{i+1}$, applied to the first input terminal IP11. More specifically, when the signal generating circuit 710*a* is operated as an i-th signal generating circuit 710*a*, the i-th signal generating circuit 710*a* is operated by a gate-on voltage Von of the gate signal $g_{i+1}$ which is applied to an (i+1)-th gate line $G_{i+1}$ (FIG. 1). Therefore, as described above in reference to FIGS. 3 and 4, a storage signal $V_{si}$ having a predetermined level is outputted by operation of the first through fifth transistors Tr1-Tr5, respectively, and the first and second capacitors C1 and C2, respectively.

Likewise, when the scanning direction of the gate driver 401 is the reverse direction, as shown in FIG. 7B, the first direction signal DIR is at the third low level voltage Vl3 and the second direction signal DIRB exhibits the third high level voltage Vh3.

Thus, the sixth transistor Tr6 is turned off, and the seventh transistor Tr7 is turned on and the signal generating circuit 710*a* is operated by a second input signal applied to the second input terminal IP12, e.g., a gate signal $g_{i-1}$. More specifically, when the signal generating circuit 710*a* is operated as the i-th signal generating circuit 710*a*, the i-th signal generating circuit 710*a* is operated by a gate-on voltage Von of the gate signal $g_{i-1}$ which is applied to an (i−1)-th gate line $G_{i-1}$. (FIG. 1). Therefore, as described above in reference to FIGS. 3 and 4, the storage signal $V_{si}$ having a predetermined level is outputted by operations of the first through fifth transistors Tr1-Tr5, respectively, and the first and second capacitors C1 and C2, respectively.

Instead of the signal generating circuit 710 (FIG. 3) being directly supplied with an input signal via the input terminal IP to turn on the first through third transistors Tr1-Tr3, respectively, the signal generating circuit 710*a* is supplied with a gate signal through the sixth transistor Tr6 as an input signal to apply to the control terminals of the first through third transistors Tr1-Tr3, respectively, when the scanning direction is the forward direction, and the signal generating circuit 710*a* is supplied with a gate signal through the seventh transistor Tr7 as the input signal to apply to the control terminals of the first through third transistors Tr1-Tr3, respectively, when the scanning direction is the reverse direction, as shown in FIG. 6. Operation of the first through fifth transistors Tr1-Tr5, respectively, and the first and second capacitors C1 and C2, respectively, is the same as those of the signal generating circuit 710, as described above in greater detail with reference to FIG. 3.

An operation of the signal generating circuit 710*a* according to an alternative exemplary embodiment of the present invention will now be described in further detail with reference to FIGS. 8A and 8B.

As shown in FIGS. 8A and 8B, the first direction signal DIRa and the second direction signal DIRBa are applied to the first and second direction control terminals IP13 and IP14, respectively, and have a third high level voltage Vh3 and a third low level voltage Vl3, respectively. Further, he third high level voltage Vh3 and the third low level voltage Vl3 are each maintained for about 1H and a duty ratio thereof may be about 50%. More specifically, the first direction signal DIRa and the second direction DIRBa alternate between the third high level voltage Vh3 and the third low level voltage Vl3 about every 1H. Further, the first direction signal DIRa and the second direction signal DIRBa have a phase difference of about 180 degrees and are inverted relative to each other.

As described above, the third high level voltage Vh3 of the first direction signal DIRa and the second direction signal DIRBa may be about 15V, for example, and the third low level voltage Vl3 thereof may be about −10V, for example.

The first direction control terminal IP13 and the second direction control terminal IP14 of the signal generating circuit 710*a* are alternately supplied with the first and second direction signals DIRa and DIRB, respectively, for each row. More specifically, in a signal generating circuit 710*a* connected to odd-numbered storage electrode lines $S_1, S_3, \ldots, S_{2n-1}$, the first direction control terminal IP13 is supplied with the first direction signal DIRa and the second direction control terminal IP14 is supplied with the second direction signal DIRBa. In contrast, in the signal generating circuit 710*a* connected to even-numbered storage electrode lines $S_2$, $S_4$, . . . , $S_{2n}$, the first direction control terminal IP13 is supplied with the second direction signal DIRBa and the second direction control terminal IP14 is supplied with the first direction signal DIRa.

Operation of the signal generating circuit 710*a* will now be described in further detail with reference to FIGS. 6 and 8A for a case when the scanning direction of the gate driver 401 is in the forward direction.

In an odd-numbered signal generating circuit 710*a*, for example, an i-th signal generating circuit 710*a*, when the first input terminal IP11 is supplied with a gate-on voltage Von of an (i+1)-th gate signal $g_{i+1}$ as a first input signal, and the second input terminal IP12 is supplied with a gate-off voltage Voff of an (i−1)-th gate signal $g_{i-1}$ as a second input signal, the first direction control terminal IP13 is supplied with the first direction signal DIRa as a first direction signal, and the second direction control terminal IP14 is supplied with the second direction signal DIRBa as a second direction signal.

For the first period T1 of the gate-on voltage Von of the gate signal $g_{i+1}$, the first direction signal DIRa is at the third low level voltage Vl3 and the second direction signal DIRBa is the third high level voltage Vh3, and the sixth transistor Tr6 is thereby turned off while the seventh transistor Tr7 is turned on. Further, the second input signal is the gate-off voltage Voff and the first through third transistors Tr1-Tr3, respectively, are therefore turned off, and thereby a storage signal $V_{si}$ remains at a previous voltage state, such as a low level storage signal voltage V−, for example, as shown in FIG. 8A.

After about 1H, e.g., for the period T2 of the gate-on voltage Von of the gate signal $g_{i+1}$, the first direction signal DIRa changes from the third low level voltage Vl3 to the third high level voltage Vh3, and the second direction signal DIRBa is changed from the third high level voltage Vh3 to the third low level voltage Vl3.

Therefore, the sixth transistor Tr6 is turned on for the period T2 of the gate-on voltage Von of the gate signal $g_{i+1}$, and the gate-on voltage Von is transmitted to the control terminals of the first through third transistors Tr1-Tr3, respectively, to turn on the first through third transistors Tr1-Tr3, respectively.

The first clock signal CK1 is at the first low level voltage Vl1 for the period T2 and the second and third clock signals CK1B and CK2, respectively, are at the first high level voltages Vh1 and Vh2, respectively, as described above with reference to FIGS. 3 and 4. Therefore, the second high level voltage Vh2 of the third clock signal CK2 and the high voltage AVDD are transmitted to the output terminal OP. Therefore, the storage signal $V_{si}$ changes from the low level storage signal voltage V− to a high level storage signal voltage V+, and the second capacitor C2 in charged.

When the first direction signal DIRa changes to the third low level voltage Vl3 after the period T2 elapses, the sixth transistor Tr6 is turned off. However, the transistor Tr5 maintains at the turned-on state by a voltage charged into the second capacitor C2, and thereby the high voltage AVDD is still transmitted to the output terminal OP such that the storage signal $V_{si}$ maintains the high level storage signal voltage V+.

Next, an operation of an even-numbered signal generating circuit 710*a*, for example an (i+1)-th signal generating circuit 710*a*, will be described in further detail.

Still referring to FIGS. 6 and 8A, in the (i+1)-th signal generating circuit 710*a*, when the first input terminal IP11 is supplied with a gate-on voltage Von of an (i+2)-th gate signal $g_{i+2}$ as a first input signal, and the second input terminal IP12 is supplied with a gate-off voltage Voff of an i-th gate signal $g_1$ as a second input signal, the first direction control terminal IP13 is supplied with the second direction signal DIRBa as a first direction signal, and the second direction control terminal IP14 is supplied with the first direction signal DIRa as a second direction signal.

Since for the first period T1 of the gate-on voltage Von of the gate signal $g_{i+1}$, the first direction signal DIRBa is at the third low level voltage Vl3, and the second direction signal DIRa is the third high level voltage Vh3, the sixth transistor Tr6 is turned off, and the seventh transistor Tr7 is turned on. The second input signal is at the gate-off voltage Voff and the first through third transistors Tr1-Tr3, respectively, are turned off, and thereby a storage signal $V_{si+1}$ maintains a previous voltage state such as a high level storage signal voltage V+, for example.

After about 1H, e.g., for the period T2 of the gate-on voltage Von of the gate signal $g_{i+2}$, the first direction signal DIRBa changes from the third low level voltage Vl3 to the third high level voltage Vh3, and the second direction signal DIRa is changed from the third high level voltage Vh3 to the third low level voltage Vl3.

Therefore, the sixth transistor Tr6 is turned on for the period T2 of the gate-on voltage Von of the gate signal $g_{i+2}$, and the gate-on voltage Von is transmitted to the control terminals of the first through third transistors Tr1-Tr3, respectively, to turn on the first through third transistors Tr1-Tr3, respectively.

The first clock signal CK1 is at the first high level voltage Vh1 and the second and third clock signals CK1B and CK2, respectively, are the first and second low level voltages Vl1 and Vl2, respectively, as described above with reference to FIGS. 3 and 4, and the low level voltage Vl2 of the third clock signal CK2 and the low voltage AVSS are thereby transmitted to the output terminal OP. Therefore, the storage signal $V_{si+1}$ changes from the high level storage signal voltage V+ to the low level storage signal voltage V−, and the first capacitor C1 is charged.

When the first direction signal DIRBa changes to the third low level voltage Vl3 after the period T2 elapses, the sixth transistor Tr6 is turned off. However, the fourth transistor Tr4 remains at a turned-on state by a voltage charged into the first capacitor C1, and thereby the low voltage AVSS is still transmitted to the output terminal OP and the storage signal $V_{si+1}$ is maintained at the low level storage signal voltage V−.

Hereinafter, operation of the signal generating circuit 710*a* will be described in further detail with reference to FIG. 8B, in which the scanning direction of the gate driver 401 is the reverse direction. In this case, waveforms of the direction signals DIRa and DIRBa are opposite to the case of the forward direction described above with reference to FIG. 8A.

Referring to FIGS. 6 and 8B, the transistor Tr7 is turned on and the first through third transistors Tr1-Tr3, respectively, are turned on for period 1H, e.g., a subsequent period T2 following the period T2 described above, of a gate-on voltage Von of a corresponding gate signal which is applied to the second input terminal IP12 as the second input signal. More specifically, the first through fifth transistors Tr1-Tr5, respectively, and the first and second capacitors C1 and C2, respectively, operate based on states of the first to third clock signals CK1, CK1B, and CK2, respectively, to transmit a storage signal to a corresponding storage electrode line. Operation of the first through fifth transistors Tr1-Tr5, respectively, and the first and second capacitors C1 and C2, respectively, are substantially the same as in the case in which the scanning direction of the gate driver is the forward direction, as described above, and have been therefore omitted herein.

As described above, in an exemplary embodiment of the present invention, the first and second direction signals DIRa and DIRBa, respectively, are applied to the first and second direction control terminals IP13 and IP14, respectively. Further, the first and second direction signals DIRa and DIRBa, respectively, alternate between the third high level voltage Vh3 and third low level voltage Vl3 each 1H. Thus, an operation characteristic variation of transistors does not occur due to the long-time application of the direction signals DIRa and DIRBa and deterioration of elements therefrom.

The signals shown in the timing diagrams of FIGS. 8A and 8B may be applied to liquid crystal displays having amorphous silicon thin film transistors as well as polysilicon thin film transistors.

In an exemplary embodiment, the gate driver 401 is a bi-directional gate driver, and one of the first through fourth scanning start signals STV1 through STV4, respectively, may be applied to the signal generating circuit 710*a* supplied with a gate signal in accordance with the scanning direction.

Hereinafter, a liquid crystal display according to an alternative exemplary embodiment of the invention will be described in further detail with reference to FIGS. 9 to 13B.

Figure 9:
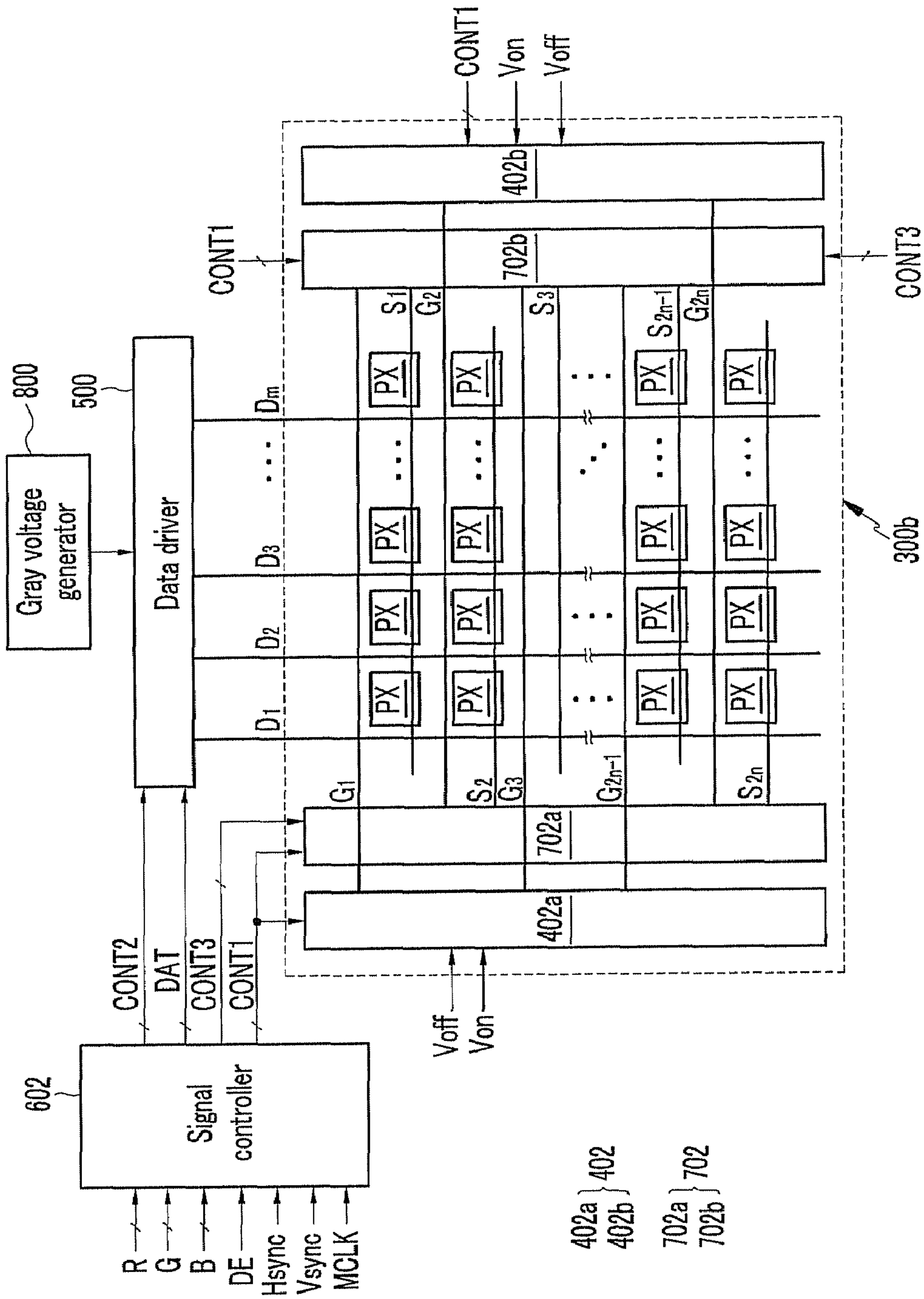
FIG. 9 is a block diagram of a liquid crystal display according to another exemplary embodiment of the present invention.
Figure 10:
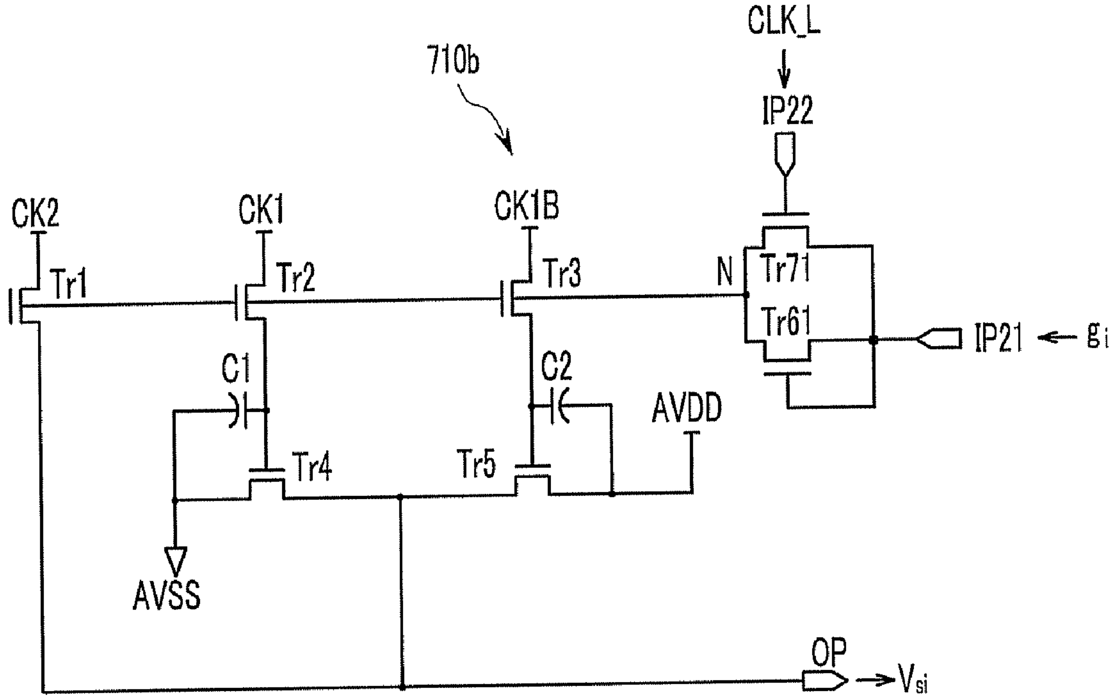
FIG. 10 is a schematic circuit diagram of a signal generating circuit of the exemplary embodiment of the present invention in FIG. 9.
Figure 11:
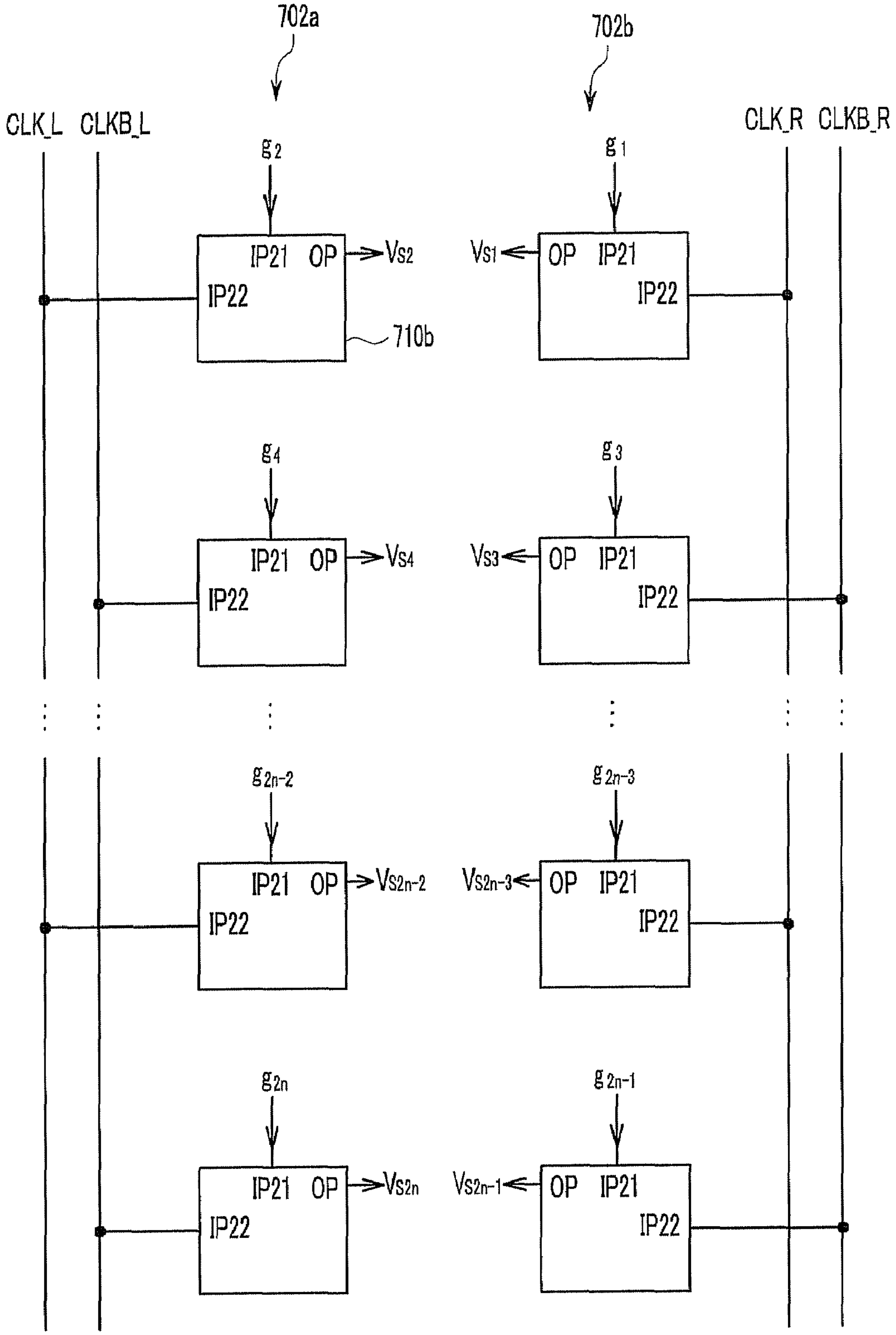
FIG. 11 is a plan layout view of the signal generating circuit of the exemplary embodiment of the present invention in FIG. 10.
Figure 12:
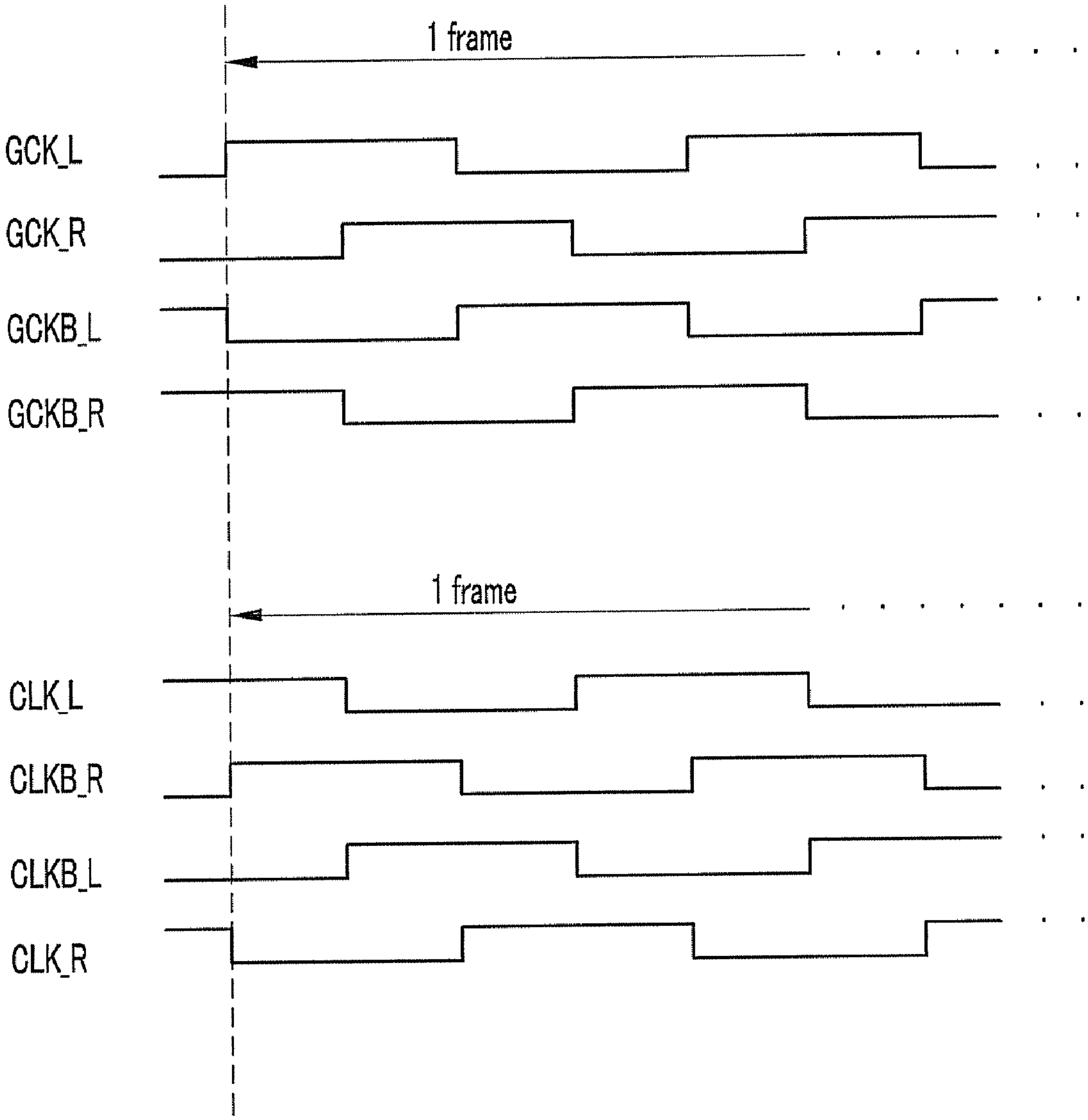
FIG. 12 is a signal timing diagram illustrating a relationship of a gate clock signal applied to a gate driver and a storage clock signal applied to a storage signal generator according to an exemplary embodiment of the present invention.
Figure 13A:
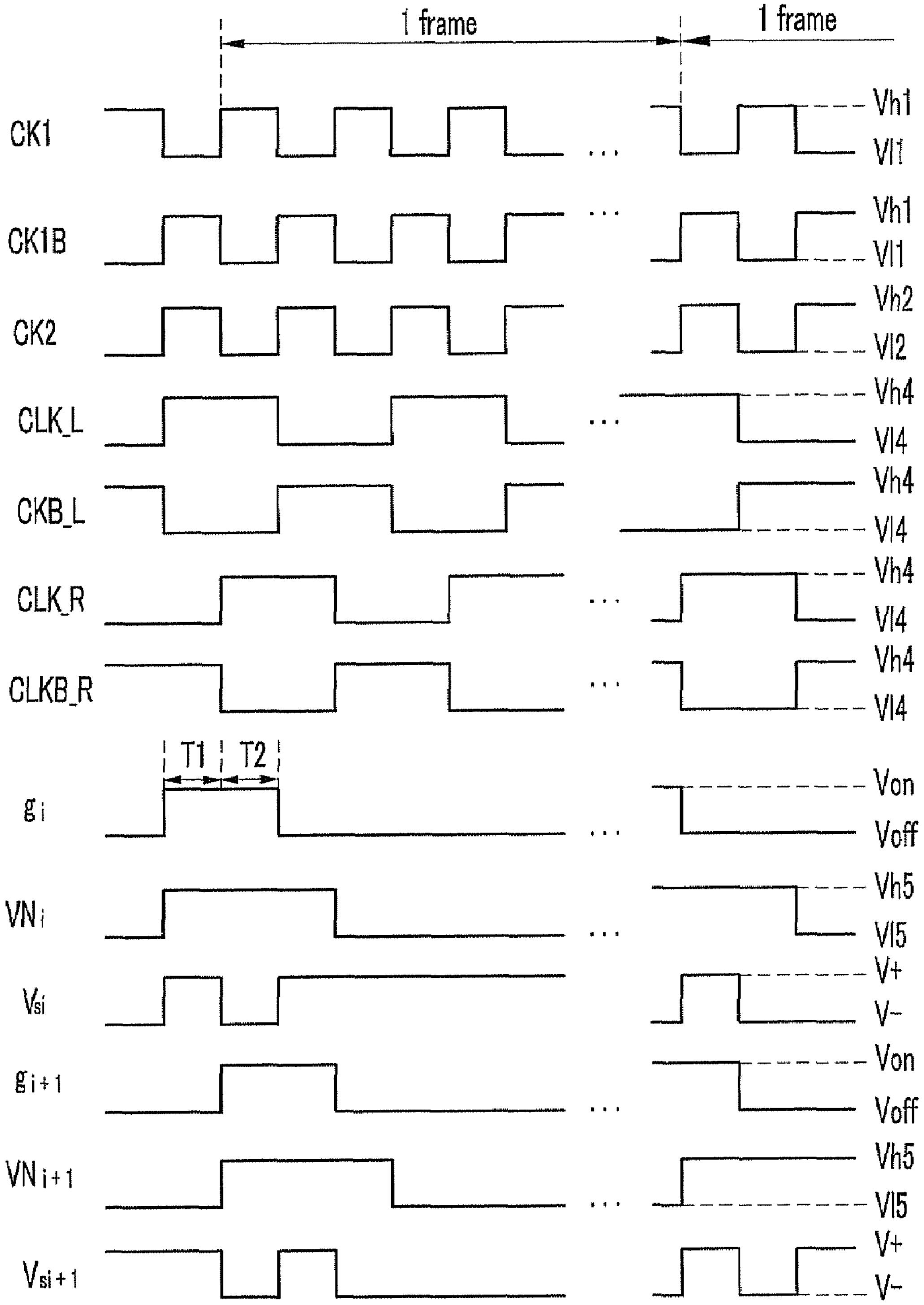
FIGS. 13A and 13B are signal timing diagrams of the signal generating circuit according to the exemplary embodiment of the present invention in FIG. 10.
Figure 13B:
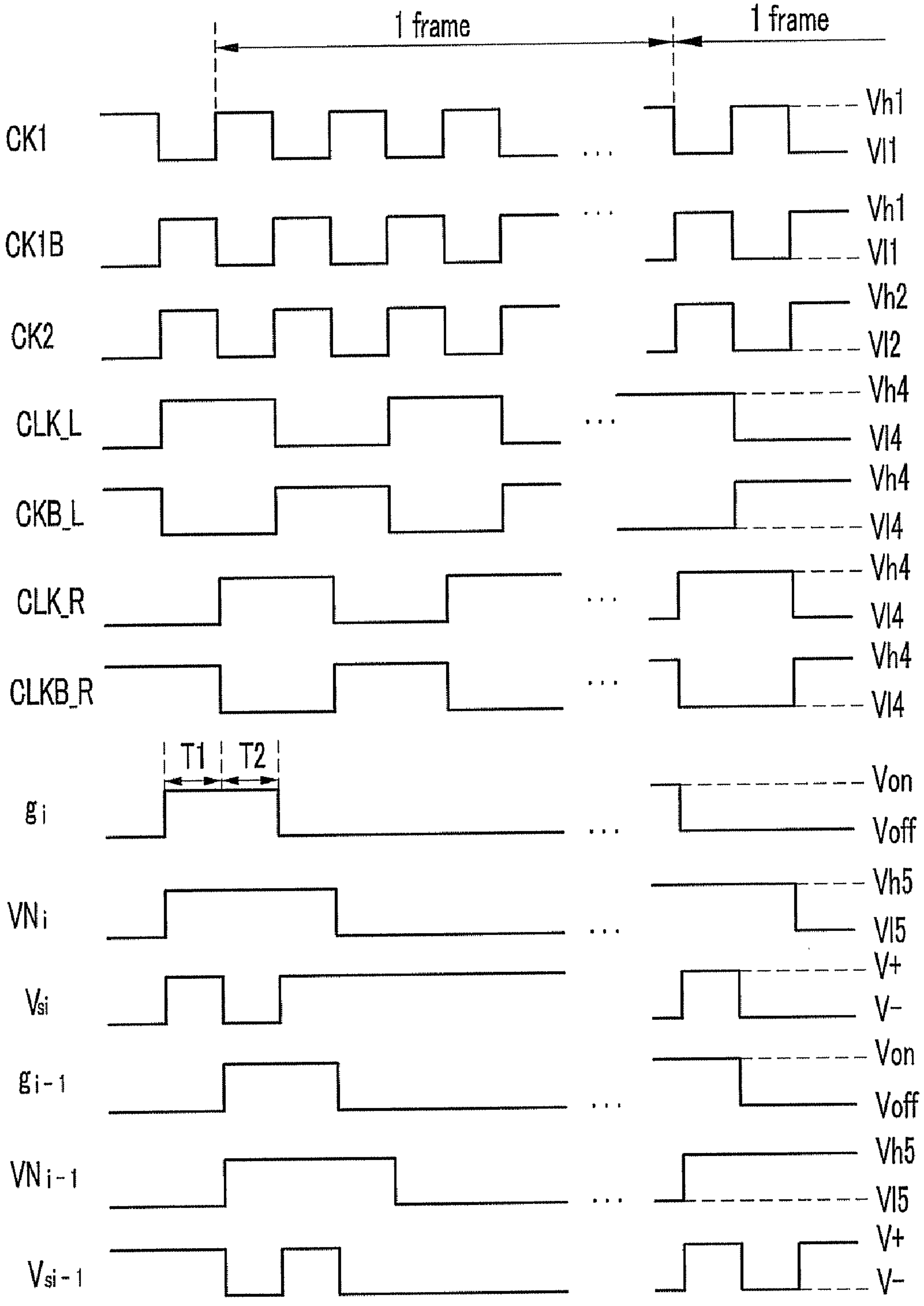

FIG. 9 is a block diagram of a liquid crystal display according to another exemplary embodiment of the invention, FIG. 10 is a schematic circuit diagram of a signal generating circuit according to the exemplary embodiment of the present invention in FIG. 9, and FIG. 11 is a plan layout view of the signal generating circuit of the exemplary embodiment of the present invention in FIG. 10. FIG. 12 is a signal timing diagram illustrating a relationship of a gate clock signal applied to a gate driver and a storage clock signal applied to a storage signal generator according to an exemplary embodiment of the present invention. FIGS. 13A and 13B are signal timing diagrams of the signal generating circuit according to the exemplary embodiment of the present invention in FIG. 10, wherein FIG. 13A is an example of signal timings when a scanning direction of a gate driver is a forward direction and FIG. 13B is an example of signal timings when a scanning direction of a gate driver is a reverse direction.

Except for variations described in further detail below, the LCD according to exemplary embodiment of the present invention shown in FIGS. 9-13B is substantially the same as the LCD shown in FIGS. 1 through 6. Therefore, elements performing the same or similar operations are indicated by the same reference numerals, and any repetitive descriptions thereof will be omitted below.

Referring to FIG. 9, an LCD includes a liquid crystal panel assembly 300*b*, a gate driver 402, a data driver 500, a gray voltage generator 800 connected to the data driver 500, a storage signal generator 702 and a signal controller 602.

Like the LCD described in greater detail above and shown in FIG. 5, the gate driver 402 is a bi-directional gate driver.

First and second storage signal generating circuits 702*a* and 702*b*, respectively, of the storage signal generator 702 may include a plurality of signal generating circuits 710*b* connected to storage electrode lines $S_1$-$S_{2n}$, and each of the signal generating circuits 710*b* is similar to the signal generating circuit 710*a* shown in FIG. 6.

As shown in FIG. 10, the signal generating circuit 710*b* includes an output terminal OP, first through fifth transistors Tr1-Tr5, respectively, and first and second capacitors C1 and C2, respectively.

The signal generating circuit 710*b* further includes an input terminal IP21 and a control terminal IP22. In an i-th signal generating circuit 710*b*, for example, the input terminal IP21 is connected to an i-th gate line $G_i$ to be supplied with an i-th gate signal $g_i$ as an input signal, and similarly, in an (i+1)-th signal generating circuit 710*b*, the input terminal IP21 is connected to an (i+1)-th gate line $G_{i+1}$ to be supplied with an (i+1)-th gate signal $g_{i+1}$ as the input signal.

The signal generating circuit 710*b* is supplied with first, second and third clock signals CK1, CK1B and CK2, respectively, of a storage control signal CONT3 from the signal controller 602, and is also supplied with a high voltage AVDD and a low voltage AVSS from the signal controller 602 or an outside device (not shown).

The signal generating circuit 710*b* is further supplied with a storage clock signal of a plurality of storage clock signals CLK_L (e.g., as shown in FIG. 10), CLK_R, CLKB_L and CLKB_R of the storage control signal CONT3 from the signal controller 602 through the control terminal IP22.

As shown in FIGS. 9 and 11, the signal generating circuits 710*b* of the first storage signal generating circuit 702*a* are located on a left side of the liquid crystal panel assembly 300*b* and generate even-numbered storage signals $V_{s2}$, $V_{s4}$, . . . , $V_{s2n}$, and are alternately supplied with storage clock signals CLK_L and CLKB_L of the plurality of storage clock signals CLK_L, CLK_R, CLKB_L and CLKB_R applied from the left side of the liquid crystal panel assembly 300*b*. The signal generating circuits 710*b* of the second storage signal generating circuit 702*b* are located on an opposite right side of the liquid crystal panel assembly 300*b* and generate odd-numbered storage signals $V_{s1}$, $V_{s3}$, . . . $V_{s2n-1}$, and are alternately supplied with storage clock signals CLKB_R and CLK_R of the plurality of storage clock signals CLK_L, CLK_R, CLKB_L and CLKB_R which are applied from the right side of the liquid crystal panel assembly 300*b*.

Positions of the first and second storage signal generating circuits 702*a* and 702*b*, respectively, on the liquid crystal panel assembly 300*b*, a connection relationship between the first and second storage signal generating circuits 702*a* and 702*b*, respectively, and the storage electrode lines, and an operating relationship of the first and second storage signal generating circuits 702*a* and 702*b*, respectively, to the plurality of storage clock signals CLK_L, CLKB_L, CLK_R and CLKB_R may be varied in alternative exemplary embodiments of the present invention.

Further, in an alternative exemplary embodiment, the plurality of storage clock signals CLK_L, CLKB_L, CLK_R and CLKB_R may be of the gate control signal CONT1 for generating the gate signals, and may be generated based on gate clock signals applied to gate driving circuits 402*a* and 402*b*.

An example of gate clock signals and storage clock signals according to an exemplary embodiment of the present invention is shown in FIG. 12.

FIG. 12 shows the storage clock signals CLK_L, CLKB_R, CLKB_L and CLK_R of the plurality of storage clock signals CLK_L, CLKB_R, CLKB_L and CLK_R applied to the first and second storage generating circuits 702*a* and 702*b*, respectively, which generate i-th, (i+2)-th, and (i+3)-th storage signals $S_i$, $S_{i+1}$, $S_{i+2}$, and $S_{i+3}$, respectively, when gate clock signals GCK_L, GCK_R, GCK_L and GCK_R are applied to the first and second gate driving circuits 402*a* and 402*b*, respectively, which generate i-th, (i+1)-th, (i+2)-th and (i+3)-th gate signals $g_i$, $g_{i+1}$, $g_{i+2}$ and $g_{i+3}$ when a scanning direction of the gate driver 402 is a forward direction.

However, when the scanning direction of the gate driver 402 is a reverse direction, the gate clock signals GCK_L, GCK_R, GCK_L and GCK_R in FIG. 12 may be signals for generating (i+3)-th, (i+2)-th, (i+1)-th, and i-th gate signals $g_{i+3}$, $g_{i+2}$, $g_{i+1}$, and $g_i$, respectively, and the storage clock signals CLK_L, CLKB_R, CLKB_L and CLK_R may by applied to the first and second storage signal generating circuits 702a and 702b, respectively, to generate the (i+3)-th, (i+2)-th, (i+1)-th and i-th storage signals $S_{i+3}$, $S_{i+2}$, $S_{i+1}$, and $S_i$, respectively.

A pulse width of the storage clock signals CLK_L, CLKB_L, CLK_R and CLKB_R may be about 2H, and a duty ratio thereof may be about 50%. The storage clock signals CLK_L, CLKB_L, CLK_R and CLKB_R swing every about 2H. Two corresponding storage clock signals CLK_R and CLKB_R, or CLK_L and CLKB_L, each have waveforms which are opposite in phase to each other, as shown in FIG. 12. A predetermined delay time occurs between each of the corresponding storage clock signals CLK_R and CLKB_R and the storage clock signals CLK_L and CLKB_L corresponding to the storage clock signals CLK_R and CLKB_R. In an exemplary embodiment, the delay time may be about 1H, for example, but is not limited thereto. The storage clock signals CLK_L, CLKB_L, CLK_R and CLKB_R have a fourth high level voltage Vh4 and a low level voltage Vl4 (FIG. 13A). For example, the high level voltage Vh4 may be about 15V, and the low level voltage Vl4 may be about −1V, but are not limited thereto.

The signal generating circuit 710b further includes an alternative sixth transistor Tr61 and an alternative seventh transistor Tr71, each of which has a control terminal, an input terminal and an output terminal.

The input and control terminals of the alternative sixth transistor Tr61 are connected to the input terminal IP21, and the output terminal of the alternative sixth transistor Tr61 is connected to the control terminals of the first through third transistors Tr1-Tr3, respectively, and the alternative sixth transistor Tr61 thereby effectively functions as a diode.

The control terminal of the alternative seventh transistor Tr71 is connected to the control terminal IP22, the input terminal of the alternative seventh transistor Tr71 is connected to the input terminal IP21 and the output terminal of the alternative seventh transistor Tr71 is connected to the control terminals of the first through third transistors Tr1-Tr3, respectively.

Operation of the signal generating circuit 710b will now be described in further detail with reference to FIG. 13A, wherein a scanning direction of the gate driver 402 is a forward direction.

When the input terminal IP21 of the signal generating circuit 710b, e.g., an i-th signal generating circuit 710b which is connected to an even-numbered storage line, is supplied with a gate-on voltage Von of an i-th gate signal $g_i$, the alternate sixth transistor Tr61 is turned on, and the first through third transistors Tr1-Tr3, respectively, are turned on.

Thus, for application of the gate-on voltage Von of the i-th gate signal $g_i$, a signal having a voltage level based on respective states of the first to third clock signals CK1, CK1B, and CK2, respectively, is transmitted to the output terminal OP and is outputted as a storage signal $Vs_i$.

For a first period T1 of the gate-on voltage Von of the gate signal $g_i$, the first clock signal CK1 is at the first low level voltage Vl1, and the second and third clock signals CK1B and CK2, respectively, are at first and second high level voltages Vh1 and Vh2, respectively, the storage signal $Vs_i$ having a high level storage signal voltage V+ is outputted from the output terminal OP by operation of the first through third transistors Tr1, Tr3 and Tr5, respectively.

However, since for a period T2 of the gate-on voltage Von of the gate signal $g_i$ the first clock signal CK1 changes to the first high level voltage Vh1, and the second and third clock signals CK1B and CK2, respectively, change to the first and second low level voltages Vl1 and Vl2, respectively, the storage signal $V_{si}$ having a low level storage signal voltage V− is transmitted to the output terminal OP by the operations of the first, second and fourth transistors Tr1, Tr2, and Tr4, respectively, such that the storage signal $V_{si}$ is changed from the high level storage signal voltage V+ to the low level storage signal voltage V−.

After the period T2, the gate signal $g_i$ is changed to the gate-off voltage Voff, and the alternate sixth transistor Tr61, which functions as a diode, is thereby turned off. As a result, a voltage $VN_i$ of a node N (FIG. 10), to which the output terminals of each of the alternative sixth and alternative seventh transistors Tr61 and Tr71, respectively, are connected, maintains a previous high state Vh5 such that the first through third transistors Tr1-Tr3, respectively, maintain the turned-on state until the storage clock signal CLK_L applied to the control terminal IP22 is again changed to the fourth high level voltage Vh4. A voltage level of the storage signal $V_{si}$ is determined according to the voltage level of the first to third clock signals CK1, CK1B, and CK2, respectively. More specifically, the first clock signal CK1 is changed to first the low level voltage Vl1 and the second and third clock signals CK1B and CK2, respectively, are changed to the first and second high level voltages Vh1 and Vh2, respectively, and the high level storage signal voltage V+ is thereby transmitted to the output terminal OP in accordance with the operations of the first, third and fifth transistors Tr1, Tr3 and Tr5, respectively, based on the first, second and third clock signals CK1, CK1B and CK2, respectively, such that the storage signal $V_{si}$ is changed from the low level storage signal voltage V− to the high level storage signal voltage V+ to be outputted from the output terminal OP.

After a predetermine time elapses, when the storage clock signal CLK_L applied to the control terminal IP22 is at the fourth high level voltage Vh4, the alternative seventh transistor Tr71 is turned on and a gate-off voltage Voff of the gate signal $g_i$ is thereby applied to the control terminals of the first through third transistors Tr1-Tr3, respectively. Thus, the first through third transistors Tr1-Tr3, respectively, are each turned off. Accordingly, the storage signal $V_{si}$ maintains the high level storage signal voltage V+ for the next frame based on a voltage charged into the capacitor C2 and operation of the fifth transistor Tr5 based on the charged voltage.

Next, an operation of the signal generating circuit 710b, for an (i+1)-th signal generating circuit 710b which is connected to an odd-numbered storage line, will be described.

Still referring to FIGS. 10 and 13A, when a gate-on voltage Von of an (i+1)-th gate signal $g_{i+1}$ is applied to the input terminal IP21, the alternative sixth transistor Tr61 is turned on, and the first through third transistors Tr1-Tr3, respectively, are turned on.

Thus, for the application of the gate-on voltage Von of the (i+1)-th gate signal $g_{i+1}$, a signal having a voltage level based on states of the first through third clock signals CK1, CK1B, and CK2, respectively, is transmitted to the output terminal OP and is outputted as a storage signal $V_{si+1}$.

For the first period T1 of the gate-on voltage Von of the gate signal $g_{i+1}$, the first clock signal CK1 is at the first high level voltage Vh1, and the second and third clock signals CK1B and CK2, respectively, are the first and second low level voltages Vl1 and Vl2, respectively, and the storage signal $V_{si+2}$ having the low level storage signal voltage V− is outputted to the output terminal OP by operation of the first, second and fourth transistors Tr1, Tr2, and Tr4, respectively.

However, for the period T2 of the gate-on voltage Von of the gate signal $g_{i+1}$, the first clock signal CK1 is changed to the first low level voltage Vl1, and the second and third clock signals CK1B and CK2, respectively, are changed to the first and second high level voltages Vh1 and Vh2, respectively, and the storage signal $Vs_{i+1}$ having a high level storage signal voltage V+ is outputted to the output terminal OP as the storage signal $V_{si+1}$ by operation of the first, second and fourth transistors Tr1, Tr2, and Tr4, respectively. Therefore, the storage signal $V_{si+1}$ is changed from the low level storage signal voltage V− to the high level storage signal voltage V+ to be output from the output terminal OP.

After the period T2, the gate signal $g_{i+1}$ is changed to a gate-off voltage Voff, but until the storage clock signal CLKB_R applied to the direction control terminal IP22 is changed to the fourth high level voltage Vh4, a voltage $VN_{i+1}$ of the node N does not change to a previous low state Vl5 but instead is maintained at the previous high state Vh5 by the alternative sixth transistor Tr61 functioning as a diode such that the firth through third transistors Tr1-Tr3, respectively, remain in the turned-on state. Accordingly, since the first clock signal CK1 is at the first high level voltage Vh1 and the second and third clock signals CK1B and CK2, respectively, are the first and second low level voltages Vl1 and Vl2, respectively, the low level storage signal voltage V− is transmitted to the output terminal OP as the storage signal $V_{si+1}$ by operation of the first, second and fourth transistors Tr1, Tr2, and Tr4. As a result, the storage signal $V_{si+1}$ is again changed from the high level storage signal voltage V+ to the low level storage signal voltage V−.

After a predetermined time elapses, the alternative seventh transistor Tr71 is turned on and the gate signal $g_{i+1}$ of the gate-off voltage Voff is applied to the control terminals of the first through third transistors Tr1-Tr3, respectively, to turn off the first through third transistors Tr1-Tr3, respectively, when the storage clock signal CLKB_R applied to the control terminal IP22 is changed to the fourth high level voltage Vh4. Therefore the storage signal $V_{si+1}$ remains at the low level storage signal voltage V− until the next frame, based on a charged voltage of the capacitor C1 and the operation of the fourth transistor Tr4.

Hereinafter, an operation of the signal generating circuit 710*b* will be described in further detail with reference to FIG. 13B, wherein the scanning direction of the gate driver 402 is the reverse direction.

As shown in FIG. 13B, operation of the signal generating circuit 710*b* is substantially the same as for operation of the signal generating circuit 710*b* when the scanning direction of the gate driver 402 is the forward direction as described above with reference to FIG. 13A except for respective gate signals applied to the input terminal IP21, and any repetitive description thereof will therefore be omitted herein.

According to an exemplary embodiment of the present invention as described above, for a time period of about 1H of the first period T1 of a gate-on voltage Von, a corresponding level of the third clock signal CK2 is outputted as a storage signal, but since a response speed of liquid crystals is slow as compared to the time period 1H, variation of the storage signal of about 1H does not cause a significant variation of the pixel electrode voltage.

Further, the storage clock signals CLK_L, CLKB_L, CLK_R and CLKB_R applied to the control terminal IP22 of the signal generating circuit 710*b* shown in FIG. 10 determine a voltage level at the node N according to the gate-off voltage Voff such that the voltage level transmitted to the output terminal OP is not changed during the time period of about 1H of the variation of the first to third clock signals CK1, CK1B, and CK2, and the voltage level of the storage signal which has an appropriate magnitude level is thereby maintained until the next frame.

Thus, in the storage signal generator 702 of the LCD according to an exemplary embodiment of the present invention, a gate line which transmits an additional gate signal in addition to the normal gate lines $G_1$-$G_{2n}$ is not necessary, and a separate direction signal corresponding to a scanning direction of the gate driver 402 is not required.

Referring to FIGS. 14 to 17B, an LCD according to another exemplary embodiment of the present invention will be described in further detail.

Figure 14:
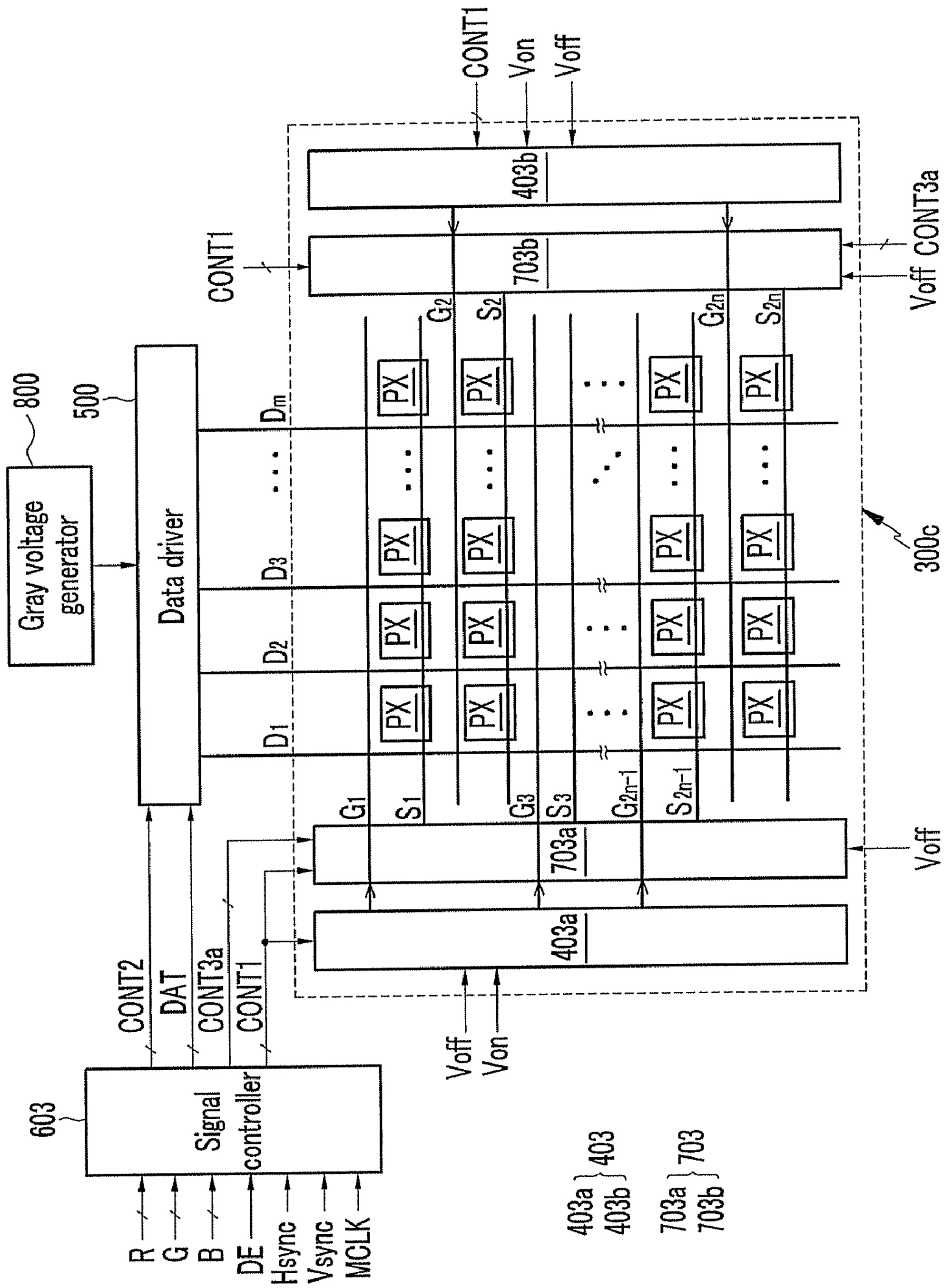
FIG. 14 is a block diagram of a liquid crystal display according to another exemplary embodiment of the present invention.
Figure 15:
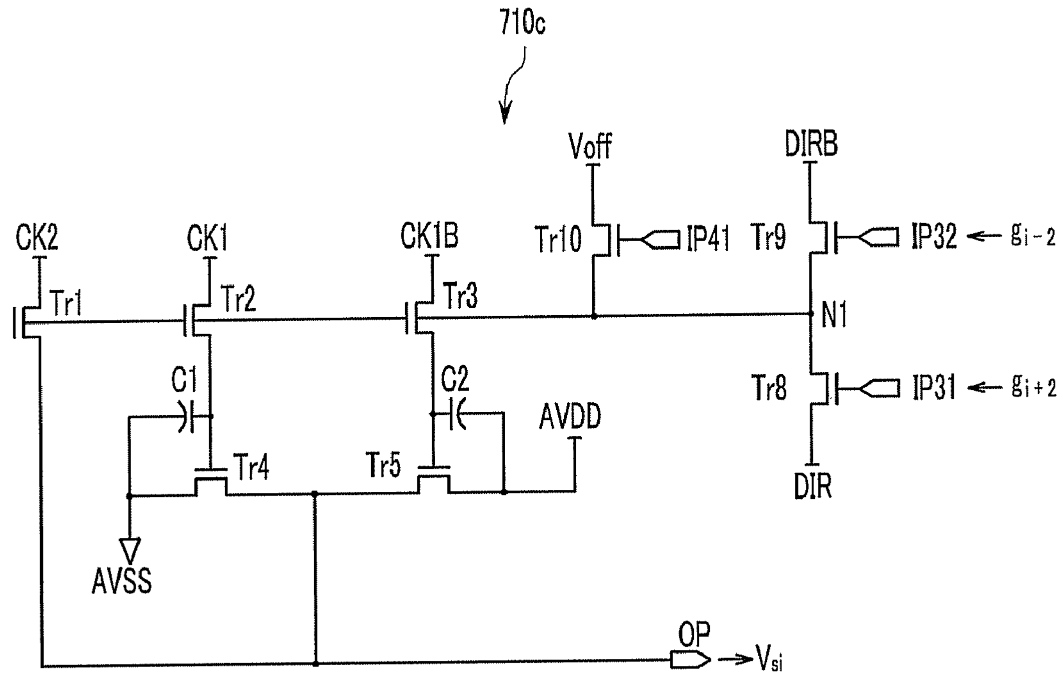
FIG. 15 is a schematic circuit diagram of a signal generating circuit according to the exemplary embodiment of the present invention in FIG. 14.
Figure 16:
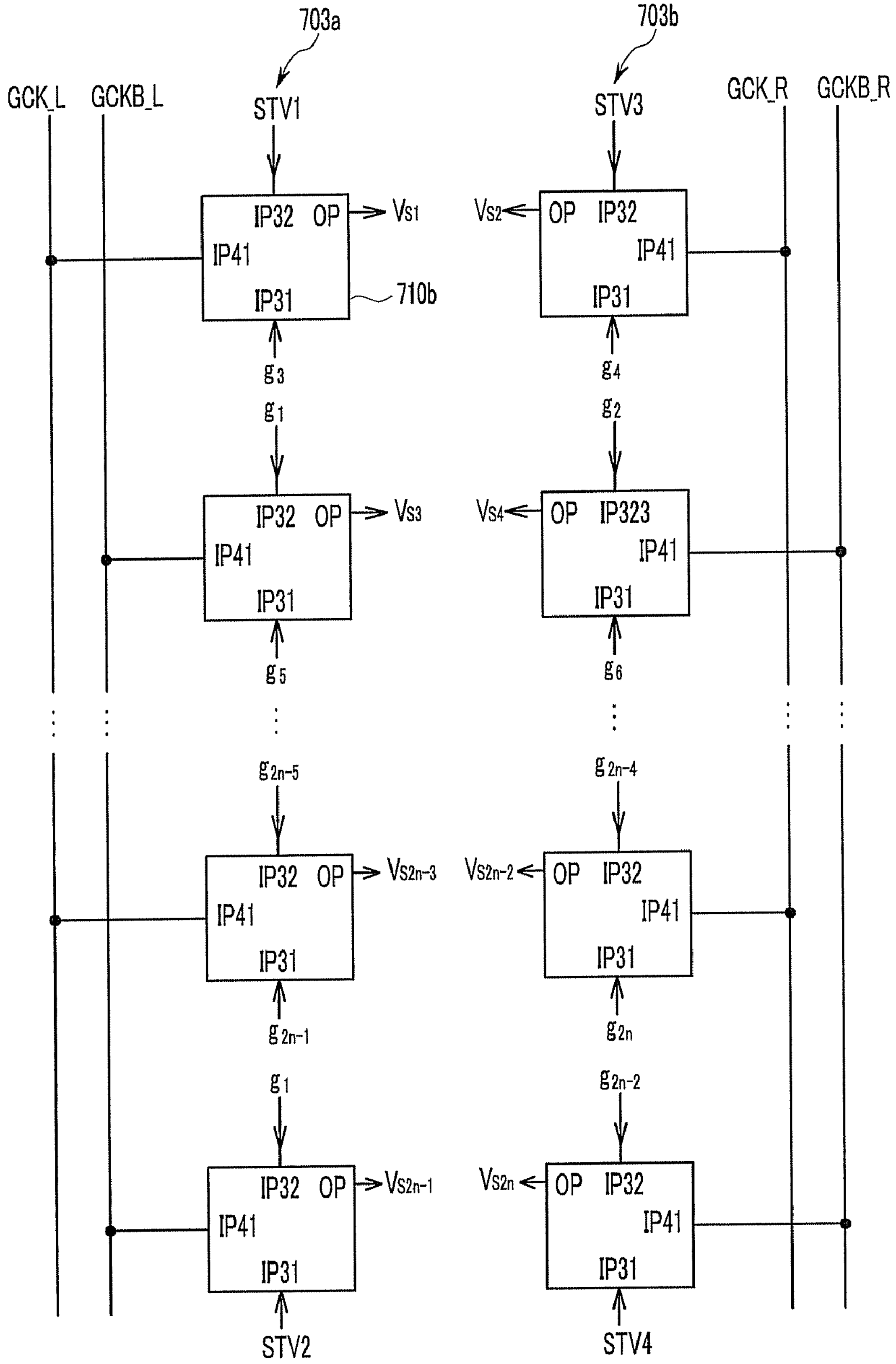
FIG. 16 is a plan layout view of the signal generating circuit according to the exemplary embodiment of the present invention in FIG. 15.
Figure 17A:
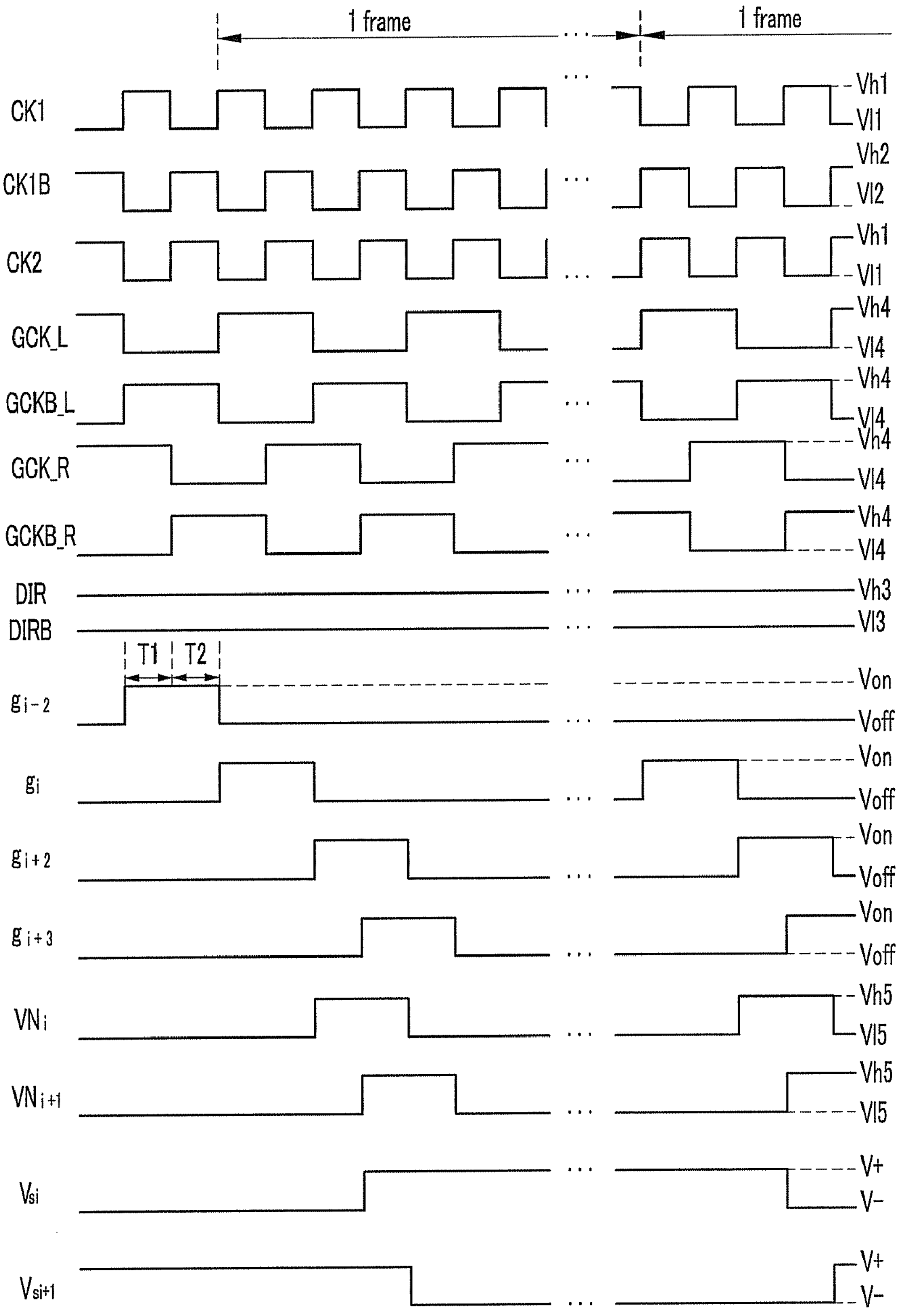
FIG. 17A is a signal timing diagram of the signal generating circuit according to the exemplary embodiment of the present invention in FIG. 15 using row inversion.
Figure 17B:
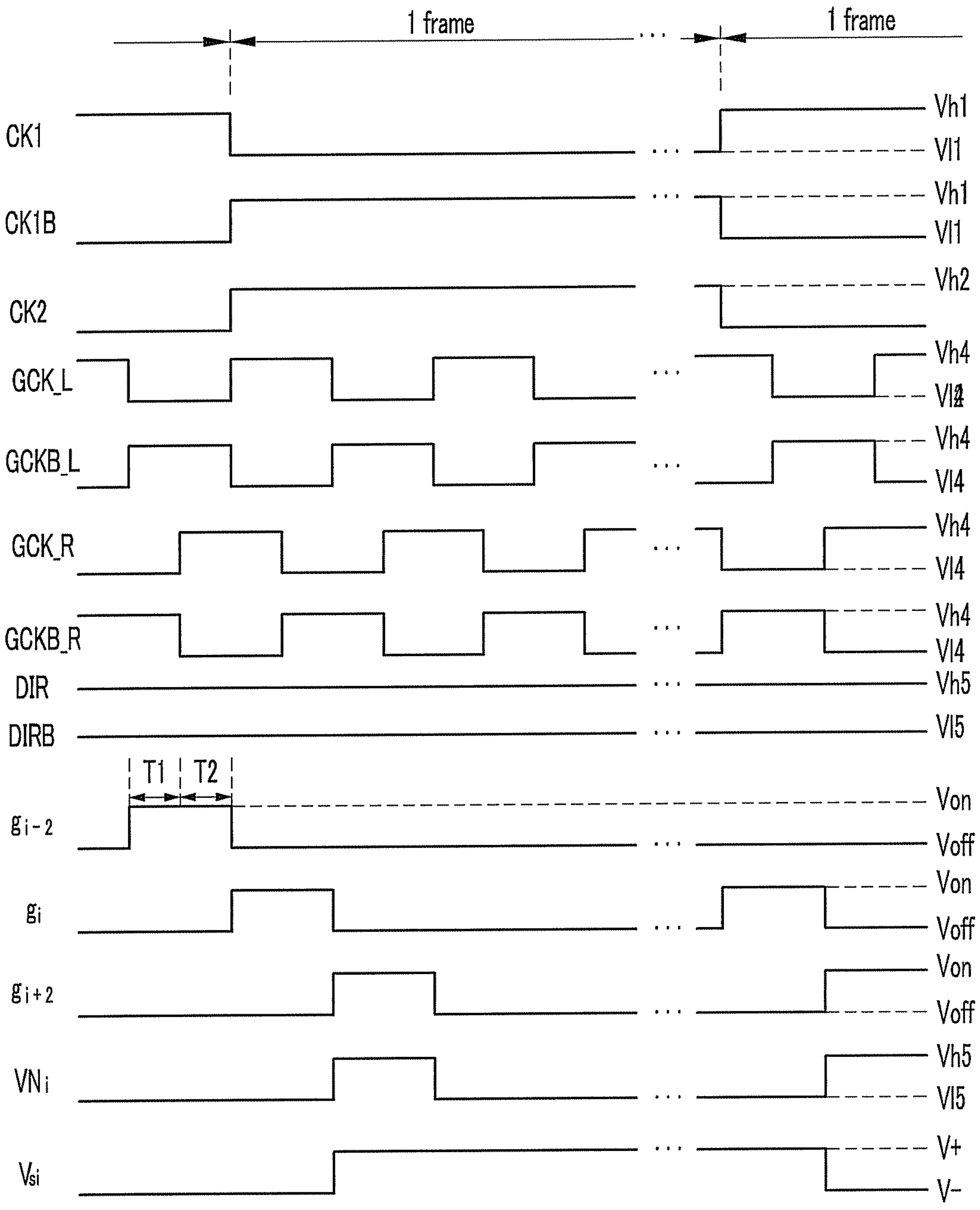
FIG. 17B is a signal timing diagram of the signal generating circuit according to the exemplary embodiment of the present invention in FIG. 15 using frame inversion.

FIG. 14 is a block diagram of a liquid crystal display according to another exemplary embodiment of the present invention. FIG. 15 is a schematic circuit diagram of a signal generating circuit according to the exemplary embodiment of the present invention in FIG. 14, FIG. 16 is a plan layout view of the signal generating circuit according to the exemplary embodiment of the present invention in FIG. 15. FIG. 17A is a signal timing diagram of the signal generating circuit shown in FIG. 15 using row inversion, and FIG. 17B is a signal timing diagram of the signal generating circuit according to the exemplary embodiment of the present invention in FIG. 15 using frame inversion.

Except for variations described in further detail below, the LCD according to the embodiment of the present invention shown in FIGS. 14-17B is substantially the same as the LCDs of the exemplary embodiments described in greater detail above. Therefore, elements performing the same or similar operations as in the above-described exemplary embodiments are indicated by the same reference numerals in FIGS. 14-17B, and any repetitive descriptions thereof will be omitted below.

As shown in FIG. 14, an LCD includes a liquid crystal panel assembly 300*c*, a gate driver 403, a data driver 500, a gray voltage generator 800 connected to the data driver 500, a storage signal generator 703 and a signal controller 603 which controls the above elements.

The gate driver 403 is a bi-directional gate driver, as in shown in FIG. 9.

The storage signal generator 703 includes first and second storage signal generating circuits 703*a* and 703*b*, respectively. The first and second storage signal generating circuits 703*a* and 703*b*, respectively, each include a plurality of signal generating circuits 710*c*, each of which is connected to the plurality of storage electrode lines $S_1$-$S_{2n}$ (FIG. 1).

Each of the signal generating circuits 710*c* is substantially the same as that shown in FIG. 10, e.g., each signal generating circuit 710*c* includes an output terminal OP, first through fifth transistors Tr1-Tr5, respectively, each having a control terminal, an input terminal and an output terminal, and first and second capacitors C1 and C2, respectively, as shown in FIG. 15.

However, each of the signal generating circuits 710*c* further includes a first input terminal IP31 and a second input terminal IP32, and a control terminal IP41.

Referring to FIG. 15, in an i-th signal generating circuit 710*c*, the first input terminal IP31 is connected to an (i+2)-th gate line $G_{i+2}$ to be supplied with an (i+2)-th gate signal $g_{i+2}$, and the input terminal IP32 is connected to an (i−2)-th gate line $G_{i-2}$ to be supplied with an (i−2)-th gate signal $g_{i-2}$.

Similarly, in an (i+1)-th signal generating circuit 710*c*, the input terminal IP31 is connected to an (i+3)-th gate line $G_{i+3}$ to be supplied with an (i+3)-th gate signal $g_{i+3}$, and the input terminal IP32 is connected to an (i−1)-th gate line $G_{i-1}$ to be supplied with an (i−1)-th gate signal $g_{i-1}$.

As shown in FIG. 16, the second input terminal IP32 of each of the first signal generating circuits 710*c* of the first and second storage signal generating circuits 703*a* and 703*b*, respectively, receives a first scanning start signal STV1 and a third scanning start signal STV3 applied to adjacent gate driving circuits 403*a* and 403*b*, respectively, and the first input terminals IP31 of a last signal generating circuit 710*c* of the first and second storage signal generating circuits 703*a* and 703*b*, respectively, are supplied with a second scanning start signal STV2 and a fourth scanning start signal STV4 applied to adjacent gate driving circuits 403*a* and 403*b*, respectively. However, in alternative exemplary embodiments, the first and second input terminals IP31 and IP32, respectively, of the first and last signal generating circuits 710*c* of the first and second storage signal generating circuits 703*a* and 703*b*, respectively, may be supplied with separate signals from an outside device (not shown) through separate signal lines such as dummy signal lines, for example, but is not limited thereto.

The signal generating circuit 710*c* is supplied with first, second and third clock signals CK1, CK1B and CK2, respectively, of the storage control signal CONT3*a* from the signal controller 603, and the signal generating circuit 710*c* is also supplied with a high voltage AVDD and a low voltage AVSS from the signal controller 603 or an outside device (not shown).

Still referring to FIG. 16, each signal generating circuit 710*c* is also supplied with one of a plurality of gate clock signals GCK_L, GCK_R, GCKB_L and GCKB_R of the gate control signal (FIG. 14) CONT1 from the signal controller 603 through the control terminal IP41.

Referring back to FIG. 15, the signal generating circuit 710*c* further includes eighth through tenth transistors Tr8-Tr10, respectively, each of which has a control terminal, an input terminal and an output terminal.

The control terminal of the eighth transistor Tr8 is connected to the first input terminal IP31, the input terminal of the eighth transistor Tr8 is connected to a first direction signal DIR of the storage control signal CONT3*a*, and the output terminal of the eighth transistor Tr8 is connected to the control terminals of the first through third transistors Tr1-Tr3, respectively.

The control terminal of the ninth transistor Tr9 is connected to the second input terminal IP32, the input terminal of the ninth transistor Tr9 is connected to a second direction signal DIRB of the storage control signal CONT 3*a* and the output terminal of the ninth transistor Tr9 is connected to the control terminals of the first through third transistors Tr1-Tr3, respectively.

The control terminal of the tenth transistor Tr10 is connected to the control terminal IP41, the input terminal of the tenth transistor Tr10 is connected to the gate-off voltage Voff and the output terminal of the tenth transistor Tr10 is connected to the control terminals of the first through third transistors Tr1-Tr3, respectively.

The operation of the first and second storage signal generating circuits 703*a* and 703*b*, respectively, each having the signal generating circuit 710*c* will be described in further detail below. For purposes of illustration only, a type of inversion of the LCD described will be row inversion.

Operation of the signal generating circuit 710*c* will be described with reference to FIG. 17A for a situation in which a scanning direction of the gate driver 403 is a forward direction, and the first direction signal DIR thereby has a high level voltage while the second direction signal DIRB has a low level voltage.

Further, operation of the signal generating circuit 710*c*, for example an i-th signal generating circuit connected to an i-th storage electrode line $S_i$ which is an odd-numbered storage electrode line, will be described with reference to FIGS. 15 and 17A.

After the application of the gate-on voltage Von of an i-th gate signal $g_i$, the gate-on voltage Von of an (i+2)-th gate signal $g_{i+2}$ is applied to the first input terminal IP31 and the eighth transistor Tr8 is thereby turned on, and the third high level voltage Vh3 of the first direction signal DIR is therefore applied to the control terminals of the first through third transistors Tr1-Tr3, respectively, through a node N1 to turn on the first through third transistors Tr1-Tr3.

Thus, as shown in FIG. 17A, for about 2H when the gate-on voltage Von of the (i+2)-th gate signal $g_{i+2}$ is applied, a corresponding voltage level based on voltage levels of the first through third clock signals CK1, CK1B and CK2, respectively, is outputted to the output terminal OP as a storage signal $V_{si}$. At this time, since an (i−2)-th gate signal $g_{i-2}$ maintains the gate-off voltage Voff, the ninth transistor Tr9 is off, and the second direction signal DIRB does not influence a voltage VN1 of the node N1.

Thus, for a first period T1 of the gate-on voltage Von of the (i−2)-th gate signal $g_{i+2}$, a storage signal $V_{si}$ at a low level storage signal voltage V− is output through the output terminal OP by operation of the first, second and fourth transistors Tr1, Tr2 and Tr4, respectively. For the period T2 of the gate-on voltage Von of the (i−2)-th gate signal $g_{i+2}$, the storage signal $V_{si}$ at a high level storage signal voltage V+0 is output through the output terminal OP by the operation of the first, third and fifth transistors Tr1, Tr3, and Tr5.

Still referring to FIG. 17A, after the period T2 of the gate-on voltage Von of the (i+2)-th gate signal gi+2, the gate clock signal GCK_L applied to the control terminal IP41 maintains a fourth high level voltage Vh4 for about 2H.

As a result, the tenth transistor Tr10 is turned on and the gate-off voltage Voff is applied to the node N1, and the first through third transistors Tr1-Tr3, respectively, are turned off.

Accordingly, the storage signal $V_{si}$ is maintained at the high level storage signal voltage V+until the next frame due to a voltage charged into the second capacitor C2 and operation of the fifth transistor Tr5 based on the charged voltage.

Next, an operation of the signal generating circuit 710C connected to an (i+1)-th storage electrode line $S_{i+1}$ which is an even-numbered storage electrode line will be described in further detail with reference to FIGS. 15 and 17A.

Like the i-the signal generating circuit 710*c*, when the gate-on voltage Von of an (i+3)-th gate signal $g_{i+3}$ is applied to the input terminal IP31, the eighth transistor Tr8 is turned on, and the first through third transistors Tr1-Tr3, respectively, are turned on by the first direction signal DIR having the third high level voltage Vh3. Thus, a storage signal $V_{si+1}$ of a corresponding level voltage based on voltage levels of the first, second and third clock signals CK1, CK1B and CK2, respectively, is output to the output terminal OP.

When a state of the (i+3)-th gate signal gi+3 changes from the gate-off voltage Voff to the gate-on voltage Von, the gate clock signal GCK_R applied to the control terminal IP41 maintains the fourth high level voltage Vh4 for about 2H.

Thus, the tenth transistor Tr10 is turned on, and the first through third transistors Tr1-Tr3 are turned off by the gate-off voltage Voff transmitted to the node N1. Subsequently, the storage signal $V_{si+1}$ maintains the low level storage signal voltage V− until the next frame based on a voltage charged into the first capacitor C1 and operation of the fourth transistor Tr4 based on the charged voltage.

In a case when the scanning direction of the gate driver 403 is a reverse direction, the first direction signal DIR has the third low level voltage Vl3 and the second direction signal DIRB has the third high level voltage Vh3. Thus, unlike the forward scanning direction, when the scanning direction is the reverse direction, the first through third transistors Tr1-

Tr3, respectively, are turned on by a gate signal applied to the second input terminal IP32 and the second direction signal DIRB.

Except for the above description, operation of the signal generating circuit 710*c* is the same in the case in which the scanning direction of the gate driver 403 is the forward direction to output storage signals having a level corresponding to a corresponding storage electrode lines, and a repetitive description of the operation of the signal generating circuit 710*c* will be omitted herein. Further, similar to the case in which the scanning direction of the gate driver 403 is the forward direction, a gate signal applied to the first input terminal IP31 outputs the gate-off voltage Voff for one frame after the output of the gate-on voltage Von for about 2H, and thereby the eighth transistor Tr8 is turned off. Therefore, the first direction signal DIR does not influence the voltage VN1 of the node N1.

Next, operation of the signal generating circuit 710*c* will be described in further detail with reference to FIGS. 15 and 17B, in which case the LCD according to an exemplary embodiment of the present invention operates in a frame inversion mode.

Operation of the signal generating circuit 710*c* will be now be described in further detail with reference to FIG. 17B. The operation of the signal generating circuit 710*c* is similar to that of the signal generating circuit 710*b* referring to FIG. 17A.

In FIG. 17A, the first, second and third clock signals CK1, CK1B and CK2, respectively, alternate each predetermined period (e.g., about 1H), but, as shown in FIG. 17B, the first, second and third clock signals CK1, CK1B and CK2, respectively, each maintain a constant voltage level for one frame. However, as shown in FIG. 17B, waveforms of each of the first, second and third clock signals CK1, CK1B and CK2, respectively, are reversed for every consecutive frame.

When the scanning direction of the gate driver 403 is the forward direction, the first direction signal DIR has a third high level voltage Vh3 and the second direction signal DIRB has a third low level voltage Vl3.

First, for data voltages having a positive polarity, for example, applied to the pixels PX, operation of an i-th signal generating circuit 710*c* connected to an i-th storage electrode line $S_i$ will be described.

The first clock signal CK1 maintains the first low level voltage V1, and the second and third clock signals CK1B and CK2, respectively, maintain the first high level voltage Vh1.

After application of the gate-on voltage Von of an i-th gate signal $g_i$, when the gate-on voltage Von of an (i+2)-th gate signal $g_{i+2}$ is applied to the first input terminal IP31, the eighth transistor Tr8 is turned on and the first through third transistors Tr1-Tr3, respectively, are turned on by the first direction signal DIR.

Since the third clock signal CK2 maintains the second high level voltage Vh2, a storage signal $V_{si}$ maintains a high level storage signal voltage V+.

When the (i+2)-th gate signal $g_{i+2}$ is changed to the gate-off voltage Voff, and the first through third transistors Tr1-Tr3, respectively, are turned off by a corresponding clock signal such as a gate clock signal GCK_L, for example, applied to the control terminal IP41, the storage signal $V_{si}$ maintains the high level storage signal voltage V+until the next frame based on a voltage charged into the second capacitor C2 and operation of the fifth transistor Tr5 based on the charged voltage.

Next, operation of the i-th signal generating circuit 710*c* connected to the i-th storage electrode line $S_i$ when data voltages having a negative polarity are applied to the pixels PX will be described in further detail. In this case, the first clock signal CK1 maintains the first high level voltage Vh1, and the second and third clock signals CK1B and CK2, respectively, maintain the first low level voltage Vl1.

After application of the gate-on voltage Von of the i-th gate signal $g_i$, when the gate-on voltage Von of the (i+2)-th gate signal $g_{i+2}$ is applied to the first input terminal IP31, the first through third transistors Tr1-Tr3, respectively, are turned on in response to the eighth transistor Tr8 turning on. Thus, the storage signal $V_{si}$ outputs a low level storage signal voltage V− by the third clock signal CK2 maintaining the second low level voltage Vl2.

Subsequently, when the (i+2)-th gate signal $g_{i+2}$ is changed to the gate-off voltage Voff, and the first through third transistors Tr1-Tr3 are turned off by the gate clock signal GCK_L applied to the control terminal IP41, the storage signal $V_{si}$ maintains the low level storage signal voltage V− until the next frame based on a voltage charged into the first capacitor C1 and operation of the fourth transistor Tr4 based on the charged voltage.

When the scanning signal of the gate driver 403 is in the reverse direction, the first direction signal DIR has a fifth low level voltage Vl5 and the second direction signal DIRB has a fifth high level voltage Vh5.

Thus, when the scanning direction of the gate driver 403 is the reverse direction, the first through third transistors Tr1-Tr3, respectively, are turned on by a gate signal applied to the second input terminal IP32 and the second direction signal DIRB. Except for the above description, operation of the signal generating circuit 710*c* is the same as for a case in which the scanning direction of the gate driver 403 is in the forward direction, as described above in greater detail, and any repetitive description of the operation of the signal generating circuit 710*c* will be omitted herein.

As described above, when the LCD operates based in the frame inversion mode, the first, second and third clock signals CK1, CK1B and CK2, respectively, maintain the same voltage level for about one frame.

Accordingly, after a gate signal applied to a corresponding pixel row is changed from the gate-on voltage Von to the gate-off voltage Voff, frame inversion occurs, since the signal generating circuit 710*c* shown in FIG. 15 operates based on the gate-on signal Von of a gate signal outputted from the next stage of the first or second gate driver 403*a* or 403*b*, respectively, and is delayed about 2H with respect to the previous stage of the first or second gate driver 403*a* or 403*b*, respectively. Thus, since a difference between the gate-on voltage Von applied to the i-th gate line $G_i$ and the gate-on voltage Von applied to the i-th storage signal generating circuit 710*c* is about 2H, the gate-on voltages Von do not overlap. Thus, after a charging operation of the i-th pixel row is substantially completed, a signal level of the storage signal $V_{si}$ applied to the i-th storage electrode line $S_i$ is changed, and the charged voltage of the i-th pixel row is thereby changed based on the changed signal level of the storage signal $V_{si}$.

Alternatively, when a predetermined time elapses after a change of a gate signal is finished, states of the first, second and third clock signals CK1, CK1B and CK2, respectively, may change and the first, second and third clock signals CK1, CK1B and CK2, respectively, may be outputted after the gate signal is changed from a gate-on voltage to a gate-off voltage or, alternatively, from a gate-off voltage to a gate-on voltage.

According to the exemplary embodiments of the present invention as described herein, since a common voltage is fixed at a predetermined level, and a storage signal of which a magnitude is changed by a predetermined period is applied to a storage electrode line, a range of a pixel electrode voltage is increased and a range of a pixel voltage is enlarged without a corresponding increase in a range of gray voltages. Thus, an effective voltage range of gray voltages is enlarged, and definition is thereby effectively improved.

Furthermore, a range of a pixel voltage generated in a case in which the range of data voltages is applied is larger than a range of a pixel voltage generated in the case in which a storage signal of a predetermined value is applied. Thus, power consumption is effectively reduced. In addition, a liquid crystal display having a bi-directional gate driver and a storage signal generator is adapted without a need for an additional selection circuit, thereby effectively reducing a size and/or manufacturing cost of the liquid crystal display.

A liquid crystal display according to the exemplary embodiments of the present invention may be operated based on frame inversion as well as row inversion, for example, but is not limited thereto in alternative exemplary embodiments.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:

a plurality of gate lines which transmits gate signals having a gate-on voltage and a gate-off voltage;

a plurality of data lines which transmits data voltages;

a plurality of storage electrode lines which transmits storage signals;

a plurality of pixels arranged in a substantially matrix pattern, wherein at least one pixel of the plurality of pixels comprises:

a switching element connected to a gate line of the plurality of gate lines and a data line of the plurality of data lines;

a liquid crystal capacitor connected to the switching element and a common voltage; and a storage capacitor connected to the switching element and a storage electrode line of the plurality of storage electrode lines;

a gate driver which generates the gate signals in a first scanning direction or a second scanning direction; and a plurality of signal generating circuits which generates the storage signals based on at least one control signal and at least one gate signal, wherein the storage signal applied to at least one pixel of the plurality of pixels has a voltage level which changes after a charging of a charged data voltage into the liquid crystal capacitor and the storage capacitor, and an output order of the storage signal from the plurality of signal generating circuits is changed according to a scanning direction of the gate driver, at least one signal generating circuit of the plurality of signal generating circuits comprises a signal inputting unit which receives at least one gate signal and outputs a driving control signal based on the at least one gate signal, the signal inputting unit comprises a first transistor and a second transistor, an output terminal of the first transistor and an output terminal of the second transistor being directly connected to each other and connected to the driving control signal, and a signal inputted to a control terminal of the first transistor and a signal inputted to a control terminal of the second transistor are different from each other.

2. The display device of claim 1, wherein the storage signal applied to the at least one pixel of the plurality of pixels changes from a low level to a high level when the charged data voltage has a positive polarity, and the storage signal applied to the at least one pixel of the plurality of pixels changes from the high level to the low level when the charged data voltage has a negative polarity.

3. The display device of claim 2, wherein a storage signal applied to a given storage electrode line of the plurality of storage electrode lines is inverted each consecutive frame.

4. The display device of claim 3, wherein the common voltage is a fixed voltage.

5. The display device of claim 4, wherein:

the plurality of pixels comprises:

a first pixel supplied with a first gate signal;

a second pixel adjacent to the first pixel and supplied with a second gate signal; and a third pixel adjacent to the first pixel and supplied with a third gate signal;

the plurality of signal generating circuits comprises:

a first signal generating circuit which transmits a first storage signal to a storage electrode line of the first pixel;

a second signal generating circuit which transmits a second storage signal to a storage electrode line of the second pixel; and a third signal generating circuit which transmits a third storage signal to a storage electrode line of the third pixel; and the second signal generating circuit is supplied with the first gate signal or the third gate signal.

6. The display device of claim 4, wherein:

the plurality of pixels comprises:

a first pixel supplied with a first gate signal;

a second pixel adjacent to the first pixel and supplied with a second gate signal; and a third pixel adjacent to the first pixel and supplied with a third gate signal;

the plurality of signal generating circuits comprises:

a first signal generating circuit which transmits a first storage signal to a storage electrode line of the first pixel;

a second signal generating circuit which transmits a second storage signal to a storage electrode line of the second pixel; and a third signal generating circuit which transmits a third storage signal to a storage electrode line of the third pixel; and the second signal generating circuit is supplied with the second gate signal.

7. The display device of claim 4, wherein the at least one control signal comprises a first control signal, a second control signal and a third control signal, and the at least one signal generating circuit of the plurality of signal generating circuits comprises:

a storage signal applying unit which receives the first control signal and transmits the first control signal as a storage signal based on the driving control signal from the signal inputting unit;

a controlling unit which receives the second control signal and the third control signal and changes an operation state of the controlling unit in accordance with the driving control signal; and a signal maintaining unit which maintains the storage signal from the storage signal applying unit based on the second control signal or the third control signal applied in accordance with the operation state of the controlling unit.

8. The display device of claim 7, wherein the signal inputting unit further receives a first direction signal and a second direction signal, each of which has a signal state according to the scanning direction of the gate driver.

9. The display device of claim 8, wherein a phase of the first direction signal and a phase of the second direction signal are substantially inverted.

10. The display device of claim 9, wherein the at least one gate signal comprises a first gate signal and a second gate signal, and a time difference between a gate-on voltage application time of the first gate signal and a gate-on voltage application time of the second gate signal is about two horizontal periods (2H).

11. The display device of claim 10, wherein the signal inputting unit selects one of the first gate signal and the second gate signal in accordance with the first direction signal and the second direction signal, and outputs the driving control signal based on the selected first gate signal or the selected second gate signal.

12. The display device of claim 11, wherein a level of the first direction signal and a level of the second direction signal are each substantially uniform.

13. The display device of claim 12, wherein the signal inputting unit comprises:

a first transistor having a control terminal connected to the first direction signal, an input terminal connected to the first gate signal and an output terminal connected to the driving control signal; and a second transistor having a control terminal connected to the second direction signal, an input terminal connected to the second gate signal and an output terminal connected to the driving control signal.

14. The display device of claim 11, wherein the first direction signal has a first level voltage and the second direction signal has a second level voltage, and the first direction signal and the second direction signal each alternates between the first level voltage and the second level voltage each consecutive predetermined period.

15. The display device of claim 14, wherein a duration of the predetermined period is about one horizontal period (1H).

16. The display device of claim 14, wherein a phase of the first direction signal applied to a first signal generating circuit of the plurality of signal generating circuits and a phase of the second direction signal applied to a second signal generating circuit of the plurality of signal generating circuits adjacent to the first signal generating circuit are substantially inverted.

17. The display device of claim 15, wherein the signal inputting unit comprises:

a first transistor having a control terminal connected to the first direction signal, an input terminal connected to the first gate signal and an output terminal connected to the driving control signal; and a second transistor having a control terminal connected to the second direction signal, an input terminal connected to the second gate signal and an output terminal connected to the driving control signal.

18. The display device of claim 9, wherein the at least one gate signal comprises a first gate signal and a second gate signal, and a time difference between a gate-on voltage application time of the first gate signal and a gate-on voltage application time of the second gate signal is about four horizontal periods (4H).

19. The display device of claim 18, wherein the signal inputting unit selects one of the first direction signal and the second direction signal in accordance with the first gate signal and the second gate signal, and outputs the driving control signal based on the selected first direction signal or the selected second direction signal.

20. The display device of claim 19, wherein a level of the first direction signal and a level of the second direction signal are each substantially uniform.

21. The display device of claim 20, wherein the signal inputting unit is further supplied with a clock signal having a first level voltage and a second level voltage different from the first level voltage, and a level of the clock signal alternates between the first level voltage and the second level voltage each consecutive predetermined period.

22. The display device of claim 21, wherein a duration of the predetermined period is about two horizontal periods (2H).

23. The display device of claim 22, wherein a phase of the clock signal applied to a first signal generating circuit of the plurality of signal generating circuits and a phase of the clock signal applied to a second adjacent signal generating circuit of the plurality of signal generating circuits are substantially inverted.

24. The display device of claim 23, wherein the signal inputting unit operates the signal maintaining unit by changing a state of the driving control signal based on the first direction signal or the second direction signal in accordance with the clock signal.

25. The display device of claim 24, wherein the signal inputting unit comprises:

a first transistor having an input terminal connected to the first direction signal, a control terminal connected to the first gate signal and an output terminal connected to the driving control signal;

a second transistor having an input terminal connected to the second direction signal, a control terminal connected to the second gate signal and an output terminal connected to the driving control signal; and a third transistor having an input terminal connected to the gate-off voltage, a control terminal connected to the clock signal and an output terminal connected to the driving control signal.

26. The display device of claim 25, wherein a voltage level of the storage signal applied to a first storage electrode line of the plurality of storage electrode lines and a voltage level of the storage signal applied to a second adjacent storage electrode line of the plurality of storage electrode lines are substantially the same.

27. The display device of claim 26, wherein a voltage level of the first control signal, a voltage level of the second control signal and a voltage level of the third control signal are substantially uniform in a given frame and are inverted for each consecutive frame.

28. The display device of claim 7, wherein the signal inputting unit is supplied with a gate clock signal and a clock signal having a first level voltage and a second level voltage different from the first level voltage, and a level of the clock signal alternates between the first level voltage and the second level voltage for each consecutive predetermined period.

29. The display device of claim 28, wherein a duration of the predetermined period is about two horizontal periods (2H).

30. The display device of claim 29, wherein a phase of the clock signal applied to a first signal generating circuit of the plurality of signal generating circuits and a phase of the clock signal applied to a second adjacent signal generating circuit of the plurality of signal generating circuits are substantially inverted.

31. The display device of claim 30, wherein the signal inputting unit operates the signal maintaining unit by changing a state of the driving clock signal based on the at least one gate signal in accordance with the clock signal.

32. The display device of claim 31, wherein the signal inputting unit comprises:

the control terminal and an input terminal of the first transistor are connected to the gate signal, and the second transistor further includes an input terminal connected to the gate signal, the control terminal of the second transistor being connected to the clock signal.

33. The display device of claim 7, wherein the storage signal applying unit comprises a first transistor having a control terminal connected to an output terminal of the signal inputting unit, an input terminal connected to the first control signal and an output terminal connected to a storage electrode line of the plurality of storage electrode lines.

34. The display device of claim 33, wherein the controlling unit comprises:

a second transistor having a control terminal connected to the output terminal of the signal inputting unit and an input terminal connected to the second control signal; and a third transistor having a control terminal connected to the output terminal of the signal inputting unit and an input terminal connected to the third control signal.

35. The display device of claim 34, wherein the signal maintaining unit comprises:

a fourth transistor having a control terminal connected to an output terminal of the third transistor, an input terminal connected to a first driving voltage and an output terminal connected to the storage electrode line;

a fifth transistor having a control terminal connected to an output terminal of the second transistor, an input terminal connected to the second driving voltage and an output terminal connected to the storage electrode line;

a first capacitor connected between the input terminal and the control terminal of the fourth transistor; and a second capacitor connected between the input terminal and the control terminal of the fifth transistor.

36. The display device of claim 7, wherein a voltage level of a storage signal applied to a first storage electrode line of the plurality of storage electrode lines and a voltage level of a storage signal applied to a second adjacent storage electrode line of the plurality of storage electrode lines are different.

37. The display device of claim 36, wherein:

the first control signal, the second control signal and the third control signal each has a first level voltage and a second level voltage, a respective level of each of the first control signal, the second control signal and the third control signal each alternates between the first level voltage and the second level voltage each consecutive predetermined period in given frame, and the respective level of each of the first control signal, the second control signal and the third control signal is inverted every other frame.

38. The display device of claim 1, further comprising at least one additional gate line which transmits a gate signal to a signal generating circuit of the plurality of signal generating circuits.

39. The display device of claim 1, wherein a gate-on voltage of a first gate signal transmitted to a first gate line of the plurality of gate lines and a gate-on voltage of a second gate signal transmitted to an adjacent second gate line of the plurality of gate lines temporally overlap each other for at least a portion of a predetermined time period.

40. The display device of claim 39, wherein a duration of the predetermined time period is about one horizontal period (1H).

* * * * *